(12) United States Patent
Choi et al.

(10) Patent No.: US 11,558,714 B2
(45) Date of Patent: Jan. 17, 2023

(54) SIGNAL OVERHEAD REDUCTION IN DISTRIBUTED POSITIONING SYSTEM

(71) Applicant: QUALCOMM Incorporated, San Diego, CA (US)

(72) Inventors: Chang-Sik Choi, Hillsborough, NJ (US); Anantharaman Balasubramanian, San Diego, CA (US); Kapil Gulati, Belle Mead, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 17/180,366

(22) Filed: Feb. 19, 2021

(65) Prior Publication Data

US 2022/0272487 A1    Aug. 25, 2022

(51) Int. Cl.
*H04W 4/029* (2018.01)
*G01S 5/00* (2006.01)
*G01S 5/02* (2010.01)

(52) U.S. Cl.
CPC .......... *H04W 4/029* (2018.02); *G01S 5/0072* (2013.01); *G01S 5/0244* (2020.05); *G01S 5/0249* (2020.05)

(58) Field of Classification Search
CPC .... H04W 4/029; G01S 5/0249; G01S 5/0244; G01S 5/0072
USPC ...................................................... 455/456.1
See application file for complete search history.

(56) References Cited

U.S. PATENT DOCUMENTS

2021/0297812 A1*   9/2021   Tyagi .................... G01C 21/30
2021/0377698 A1    12/2021   Manolakos et al.
2022/0015056 A1*   1/2022   Choi ...................... G01S 1/042

FOREIGN PATENT DOCUMENTS

WO    WO-2019197036 A1    10/2019
WO    WO-2021221362 A1    11/2021

OTHER PUBLICATIONS

International Search Report and Written Opinion—PCT/US2022/011590—ISA/EPO—dated Mar. 29, 2022.

\* cited by examiner

*Primary Examiner* — Ted M Wang
(74) *Attorney, Agent, or Firm* — Thien T. Nguyen

(57) ABSTRACT

A user equipment (UE) initiates a positioning session based on ranging in a distributed system of UEs. The positioning session includes a plurality of anchor UEs with known positions that provide information including ranging information and their positions to the initiator UE in post-ranging messages. The initiator UE identifies anchor UEs that provide information that does not significantly contribute to the final position estimate for the initiator UE. The initiator UE, for example, may generate position estimates and associated accuracy levels for different subsets of anchor UEs and may use the accuracy levels to identify a subset of anchor UEs that may be used for positioning in place of the full set of anchor UEs without a significant loss of accuracy. Selected UEs are excluded from providing post-ranging messages in subsequent positioning sessions to reduce signaling overhead and improve efficiency.

39 Claims, 10 Drawing Sheets

| Post-PRS Source | (UE1) | (UE1)+(UE2) | (UE1)+(UE2)+ (UE3) | (UE1)+(UE2)+ (UE3)+(UE4) |
|---|---|---|---|---|
| Pos Est of UEX (x,y) | (16~19,6~8) | (17,6~8) | (17.5,7) | (17.5,6.8) |

FIG. 5A

| Post-PRS Source | (UE1) | (UE1)+(UE2) | (UE1)+(UE2)+ (UE3) | (UE1)+(UE2)+ (UE3)+(UE4) |
|---|---|---|---|---|
| Pos Est of UEX (x,y) | (16~19,6~8) Sigma = (9,4) | (17,6~8) Sigma = (1,4) | (17.5,7) Sigma = (0.5,1) | (17.5,6.8) Sigma = (0.45,0.8) |

FIG. 5B

| UEX | | UEY | |
|---|---|---|---|
| Estimate | Confidence | Estimate | Confidence |
| (UE1,UE2,UE3,UE4) | K1 | (UE1,UE2,UE3,UE4) | M1 |
| (UE1,UE2,UE3) | K2 | (UE1,UE2,UE3) | M2 |
| (UE1,UE2,UE4) | K3 | (UE1,UE2,UE4) | M3 |
| (UE1,UE3,UE4) | K4 | (UE1,UE3,UE4) | M4 |
| (UE2,UE3,UE4) | K5 | (UE2,UE3,UE4) | M5 |

FIG. 7

SIGNAL OVERHEAD REDUCTION IN DISTRIBUTED POSITIONING SYSTEM

BACKGROUND

Background Field

The subject matter disclosed herein relates to wireless communications systems, and more particularly to methods and apparatuses for location determination of a user equipment in a distributed wireless communications system.

Relevant Background

Obtaining accurate position information for user equipment, such as cellular telephones or other wireless communication devices, is becoming prevalent in the communications industry. For example, obtaining highly accurate locations of vehicles or pedestrians is essential for autonomous vehicle driving and pedestrian safety applications.

A common means to determine the location of a device is to use a satellite positioning system (SPS), such as the well-known Global Positioning Satellite (GPS) system or Global Navigation Satellite System (GNSS), which employ a number of satellites that are in orbit around the Earth. In certain scenarios, however, location determination signals from an SPS may be unreliable or unavailable, e.g., during adverse weather conditions or in areas with poor satellite signal reception such as tunnels or parking complexes. Moreover, position information generated using SPS is prone to imprecision. For example, off-the-shelf GPS positioning devices have an accuracy of a few meters, which is not optimal to ensure safe autonomous driving and navigation.

Coordinated or automated driving requires communications between vehicles, which may be direct or indirect, e.g., via an infrastructure component such as a roadside unit (RSU). For vehicle safety applications, both positioning and ranging are important. For example, vehicle user equipments (UEs) may perform positioning and ranging using sidelink signaling, e.g., broadcasting ranging signals for other vehicle UEs or pedestrian UEs to determine the relative location of the transmitter. An accurate and timely knowledge of the relative locations or ranges to nearby vehicles, enables automated vehicles to safely maneuver and negotiate traffic conditions. Round trip time (RTT), for example, is a technique commonly used for determining a range between transmitters. RTT is a two-way messaging technique in which the time between sending a ranging signal from a first device to receiving an acknowledgement (e.g., in the form of a return ranging signal) from a second device (minus processing delays) corresponds to the distance (range) between the two devices.

During a ranging session multiple messages are exchanged between participating UEs. Where multiple nearby UEs are participating in the ranging session, each participating UE transmits multiple messages, which may significantly increase overhead. Accordingly, improvements are desirable to reduce overhead during a ranging session involving multiple participating UEs.

SUMMARY

A user equipment (UE) initiates a positioning session based on ranging in a distributed system of UEs. The positioning session includes a plurality of anchor UEs with known positions that provide information including ranging information and their positions to the initiator UE in post-ranging messages. The initiator UE identifies anchor UEs that provide information that does not significantly contribute to the final position estimate for the initiator UE. The initiator UE, for example, may generate position estimates and associated accuracy levels for different subsets of anchor UEs and may use the accuracy levels to identify a subset of anchor UEs that may be used for positioning in place of the full set of anchor UEs without a significant loss of accuracy. Selected UEs are excluded from providing post-ranging messages in subsequent positioning sessions to reduce signaling overhead and improve efficiency.

In one implementation, a method of positioning based on ranging performed by a UE in a distributed system of user equipments (UEs), the method includes initiating a first positioning session directly with a first plurality of responder UEs, wherein the first plurality of responder UEs comprises a set of anchor UEs; receiving from each anchor UE in the first positioning session a post-ranging message comprising information including a known position of the respective anchor UE; determining estimated positions for the UE and accuracy levels associated with each estimated position based on the information received from different subsets of anchor UEs; selecting at least one anchor UE to be excluded from a subsequent positioning session based on the accuracy levels determined based on the information received from the different subsets of anchor UEs; and initiating a second positioning session directly with a second plurality of responder UEs, wherein the selected at least one anchor UE is excluded from the second positioning session.

In one implementation, a user equipment (UE) configured for positioning based on ranging in a distributed system of UEs, the UE includes a wireless transceiver configured to wirelessly communicate with entities in a wireless network; at least one memory; and at least one processor coupled to the wireless transceiver and the at least one memory, wherein the at least one processor is configured to: initiate a first positioning session directly with a first plurality of responder UEs, wherein the first plurality of responder UEs comprises a set of anchor UEs; receive from each anchor UE in the first positioning session a post-ranging message comprising information including a known position of the respective anchor UE; determine estimated positions for the UE and accuracy levels associated with each estimated position based on the information received from different subsets of anchor UEs; select at least one anchor UE to be excluded from a subsequent positioning session based on the accuracy levels determined based on the information received from the different subsets of anchor UEs; and initiate a second positioning session directly with a second plurality of responder UEs, wherein the selected at least one anchor UE is excluded from the second positioning session.

In one implementation, a user equipment (UE) configured for positioning based on ranging in a distributed system of UEs, the UE includes means for initiating a first positioning session directly with a first plurality of responder UEs, wherein the first plurality of responder UEs comprises a set of anchor UEs; means for receiving from each anchor UE in the first positioning session a post-ranging message comprising information including a known position of the respective anchor UE; means for determining estimated positions for the UE and accuracy levels associated with each estimated position based on the information received from different subsets of anchor UEs; means for selecting at least one anchor UE to be excluded from a subsequent positioning session based on the accuracy levels determined based on the information received from the different subsets of anchor UEs; and means for initiating a second positioning session directly with a second plurality of responder UEs, wherein the selected at least one anchor UE is excluded from the second positioning session.

In one implementation, a non-transitory storage medium including program code stored thereon, the program code is operable to configure at least one processor in a user equipment (UE) to perform positioning based on ranging in a distributed system of UEs, the program code comprising instructions to: initiate a first positioning session directly with a first plurality of responder UEs, wherein the first plurality of responder UEs comprises a set of anchor UEs; receive from each anchor UE in the first positioning session a post-ranging message comprising information including a known position of the respective anchor UE; determine estimated positions for the UE and accuracy levels associated with each estimated position based on the information received from different subsets of anchor UEs; select at least one anchor UE to be excluded from a subsequent positioning session based on the accuracy levels determined based on the information received from the different subsets of anchor UEs; and initiate a second positioning session directly with a second plurality of responder UEs, wherein the selected at least one anchor UE is excluded from the second positioning session.

In one implementation, a method of positioning based on ranging in a distributed system of user equipment (UE) performed by a UE, the method includes receiving a first initial pre-ranging message broadcast from a initiator UE to initiate a first positioning session, the first initial pre-ranging message identifying a set of responder UEs including the UE; participating in the first positioning session with the initiator UE including sending a post-ranging message comprising information including a known position for the UE to the initiator UE; receiving a second initial pre-ranging message broadcast from the initiator UE to initiate a second positioning session, the second initial pre-ranging message identifying the set of anchor UEs including the UE; and receiving from the initiator UE an indication that the UE will not transmit the post-ranging message in the second positioning session.

In one implementation, a user equipment (UE) configured for positioning based on ranging in a distributed system of UEs, the UE includes wireless transceiver configured to wirelessly communicate with entities in a wireless network; at least one memory; and at least one processor coupled to the wireless transceiver and the at least one memory, wherein the at least one processor is configured to: receive a first initial pre-ranging message broadcast from a initiator UE to initiate a first positioning session, the first initial pre-ranging message identifying a set of responder UEs including the UE; participate in the first positioning session with the initiator UE including being configured to send a post-ranging message comprising information including a known position for the UE to the initiator UE; receive a second initial pre-ranging message broadcast from the initiator UE to initiate a second positioning session, the second initial pre-ranging message identifying the set of anchor UEs including the UE; and receive from the initiator UE an indication that the UE will not transmit the post-ranging message in the second positioning session.

In one implementation, a user equipment (UE) configured for positioning based on ranging in a distributed system of UEs, includes means for receiving a first initial pre-ranging message broadcast from a initiator UE to initiate a first positioning session, the first initial pre-ranging message identifying a set of responder UEs including the UE; means for participating in the first positioning session with the initiator UE including sending a post-ranging message comprising information including a known position for the UE to the initiator UE; means for receiving a second initial pre-ranging message broadcast from the initiator UE to initiate a second positioning session, the second initial pre-ranging message identifying the set of anchor UEs including the UE; and means for receiving from the initiator UE an indication that the UE will not transmit the post-ranging message in the second positioning session.

In one implementation, a non-transitory storage medium including program code stored thereon, the program code is operable to configure at least one processor in a user equipment (UE) to perform positioning based on ranging in a distributed system of UEs, includes receive a first initial pre-ranging message broadcast from an initiator UE to initiate a first positioning session, the first initial pre-ranging message identifying a set of responder UEs including the UE; participate in the first positioning session with the initiator UE including comprising instructions to send a post-ranging message comprising information including a known position for the UE to the initiator UE; receive a second initial pre-ranging message broadcast from the initiator UE to initiate a second positioning session, the second initial pre-ranging message identifying the set of anchor UEs including the UE; and receive from the initiator UE an indication that the UE will not transmit the post-ranging message in the second positioning session.

BRIEF DESCRIPTION OF THE DRAWING

Non-limiting and non-exhaustive aspects are described with reference to the following figures, wherein like reference numerals refer to like parts throughout the various figures unless otherwise specified.

FIG. 5A is a table illustrating an example of the incremental improvement of a position estimate for a UE based on the information provided by a plurality of anchor UEs.

FIG. 5B is another table, similar to the table shown in FIG. 5A, but illustrates an example of the incremental improvement of a position estimate and accuracy level for the UE that may be generated by an Extended Kalman Filter (EKF).

FIG. 7 illustrates a table showing examples of position estimates and corresponding accuracy levels for multiple UEs in a positioning session.

DETAILED DESCRIPTION

Figure 1:
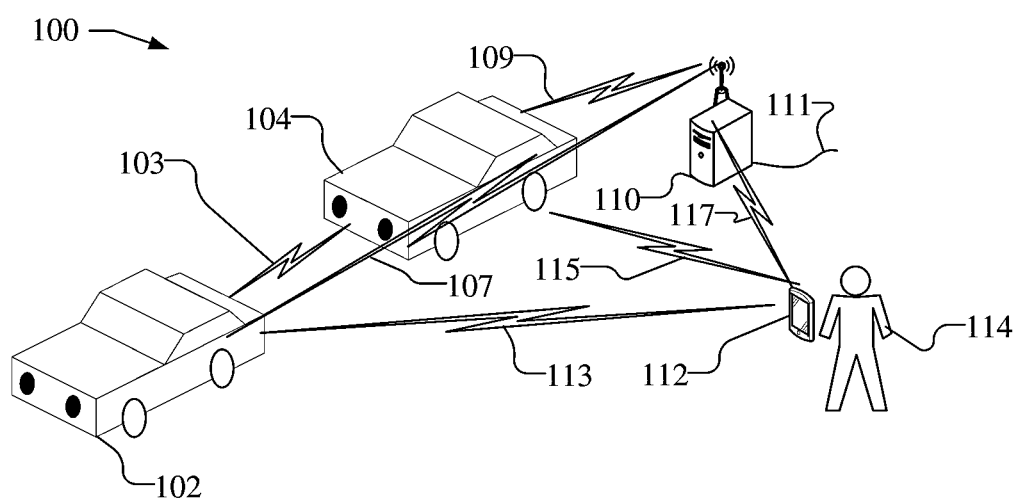
FIG. 1 illustrates a wireless communication system illustrating distributed UE communications, including ranging signaling.

A distributed approach may be used for ranging and positioning of vehicles, roadside units (RSU), and pedestrian and may avoid the need for a centralized base station to coordinate and relay communications. Such communications may be used, for example, for automated driving and vehicle safety applications. Communications used in a distributed approach may be made directly, e.g., between vehicles, or between vehicles and a RSU or pedestrian. These communications may include messages and information elements (IEs) with which a vehicle may provide information necessary for automated driving.

For example, for safe operation of autonomous vehicles, the relative locations or ranges to other vehicles needs to be determined. Various approaches may be used to derive the relative positions between vehicles. For example, relative positions of vehicles may be derived using ranging signaling. Ranging signals are sometimes referred to as physical ranging signals, positioning ranging signals, positioning reference signals, or physical referencing signals, and may be collectively referred to herein as PRS signals. PRS signals, for example, may be broadcast by a user equipment (UE) in a vehicle, sometimes referred to as V-UE, and received by other V-UEs and/or infrastructure, e.g., RSU, or UEs held by a pedestrian, using direct communication systems, such as dedicated short-range communication (DSRC), cellular Vehicle-to-Everything (C-V2X) communication, and 5G New Radio (NR) communications. PRS signals are used to determine a range to the broadcasting vehicle, e.g., using one way ranging, round-trip-time (RTT) positioning operations, or other standard positioning operations such as time of arrival (TOA), time difference of arrival (TDOA) or observed time difference of arrival (OTDOA).

In a distributed system, an individual UE is able to range with respect to other UEs that are nearby using messages and positioning signals that are transmitted directly to the other UEs. In an RTT-based ranging session, for example, multiple messages and signals are transmitted and received by each UE. For example, an initial set of pre-ranging signal messages (pre-PRS messages) are transmitted and received to request and accept a ranging session, followed by broadcasting the ranging signals (PRS signals) for measurement, which is followed by a set of post-ranging signal messages (post-PRS messages) that exchange measurement payloads. For RTT-based ranging and positioning, for example, the time of arrival (TOA) and time of departure (TOD) measurements of transmitted and received PRS signals may be provided in the post-PRS messages and used by each UE pair to determine the range between the UEs. The pre-PRS and post-PRS messages may be sent over a licensed spectrum to guarantee reliability, while the PRS signals may be broadcast over an unlicensed spectrum (e.g., to enjoy a larger available bandwidth in e.g., UNI-III spectrum).

A ranging session may include one initiator UE and multiple responder UEs. The post-PRS messages broadcast by each UE may be configured to be received and used by all other participating UEs in the ranging session. The post-PRS message broadcast by a UE may include the ToD of the PRS signal that was broadcast by the UE, as well as the ToA of the PRS signal received from all other participating UEs. The post-PRS message may further include, e.g., the angle of departure (AoD) of the broadcast PRS signal and the angle of arrival (AoA) of the PRS signal received from all other participating UEs. The post-PRS message may further include the location of the UE, the orientation of UE, a broadcast indicator of the UE PRS, a reception indicator of PRS of the other UEs, as well as other related measurements, e.g., including map information, the locations of reflectors with respect to the UE, etc. Thus, the post-PRS messages may include a significant amount of information, and as the number of UEs participating in the ranging session, the number of broadcast post-PRS messages will increase and the payload size of each post-PRS message will increase. The post-PRS messages, thus, may be the source of a significant overhead in ranging sessions.

In some instances, a post-PRS message provided by a UE may not provide significantly useful information for ranging or positioning for a particular UE. In other words, in some cases, the usefulness of the information provided by a UE in its post-PRS message may be marginal and may not significantly improve the range or position information for another UE. For example, updating a UEs position using information acquired from post-PRS messages from additional UEs in some instances may reach a point of diminishing returns. In the case of ranging session that includes an initiator UE and several anchor responder UEs, if some of the anchor UEs are clustered in the same location, then the extra information provided by the post-PRS messages from the clustered anchor UEs may provide only a small improvement in terms of positioning accuracy of the initiator UE.

Accordingly, in an implementation as discussed herein, during a ranging or positioning session that includes a plurality of responder UEs, an initiator UE may determine an estimated position and an accuracy level associated with the estimated position using information from all of the responder UEs. The initiator UE may additionally determine estimated positions and associated accuracy levels for a number of subsets of the plurality of responder UEs. Based on the accuracy levels generated for the various subsets of responder UEs and the accuracy level generated for the complete set of responder UEs, the initiator UE may select at least one responder UE that can be excluded from subsequent positioning sessions without significantly decreasing a desired accuracy level of the position estimate and may initiate subsequent positioning sessions accordingly. For example, a subsequent positioning session may be initiated without the selected UE or subsequent positioning session may be initiated with the selected UE, but with an indication that the selected UE will not transmit the post-PRS message (and/or other messages) during the positioning session.

FIG. 1 illustrates a wireless communication system 100 illustrating distributed communications, including ranging signaling to support positioning sessions that uses ranging and overhead reduction, as described herein. Wireless communication system 100 illustrates a first vehicle 102 with a first wireless device, e.g., V-UE 102, in wireless communications with another V-UE 104, illustrated as a second vehicle. The V-UE 102 and V-UE 104 may comprise, but are not limited to, an on-board unit (OBU), a vehicle or subsystem thereof, or various other communication devices. The V-UEs 102 and 104 function and provide communications on behalf of their associated vehicles and, accordingly, may be sometimes referred to herein simply as vehicles 102 and 104 or UEs 102 and 104. The first UE 102 and second UE 104, for example, may be two vehicles traveling on a road along with other vehicles, not illustrated.

The wireless communication system 100 may use, e.g., Vehicle-to-Everything (V2X) communication standard, in which information is passed between a vehicle and other entities within the wireless communication network. The V2X services include, e.g., services for Vehicle-to-Vehicle (V2V), Vehicle-to-Pedestrian (V2P), Vehicle-to-Infrastructure (V2I), and Vehicle-to-Network (V2N). The V2X standard aims to develop autonomous or semi-autonomous driving systems, such as Advanced Driver Assistance System (ADAS), which helps drivers with critical decisions, such as lane changes, speed changes, overtaking speeds, and may be used to assist in parking as discussed herein. Low latency communications are used in V2X and are therefore suitable for precise relative positioning, e.g., using ranging signals, such as one way ranging, RTT, TDOA, etc.

In general, there are two modes of operation for V2X services, as defined in Third Generation Partnership Project (3GPP) TS 23.285. One mode of operation uses direct wireless communications between V2X entities, which may sometimes be referred to as sidelink communication. The other mode of operation uses network based wireless communication between entities. The two modes of operation may be combined, or other modes of operation may be used if desired.

The wireless communication system 100 may operate using direct or indirect wireless communications between the UE 102 and UE 104. For example, the wireless communication may be over, e.g., Proximity-based Services (ProSe) Direction Communication (PC5) reference point as defined in 3GPP TS 23.303, and may use wireless communications under IEEE 1609, Wireless Access in Vehicular Environments (WAVE), Intelligent Transport Systems (ITS), and IEEE 802.11p, on the ITS band of 5.9 GHz, or other wireless connections directly between entities. Thus, as illustrated, UE 102 and UE 104 may directly communicate using with a Vehicle-to-Vehicle (V2V) communication link 103. UE 102 and UE 104 may similarly directly communicate with roadside unit (RSU) 110 via Vehicle-to-Infrastructure (V2I) communication links 107 and 109, respectively. The RSU 110, for example, may be a stationary infrastructure entity, that may support V2X applications and that can exchange messages with other entities supporting V2X applications. An RSU may be a logical entity that may combine V2X application logic with the functionality of base stations in a RAN, such as an eNB, ng-eNB, or eLTE (referred to as eNB-type RSU) or a gNB, or UE (referred to as UE-type RSU). The RSU 110 may include a backhaul connection to a network, illustrated by wired connection 111, but may via a wireless Uu interface to a base station. The RSU 110 may be used for ranging with UEs 102, 104, or other UEs, and because the position of the RSU 110 may be known precisely, the RSU 110 may be used as an anchor UE with which a position of the UE 102, 104 or other UEs may be determined. The RSU 110 may sometimes be referred to herein as UE 110. The UEs 102, 104 and UE 110 may communicate with additional entities, such as additional vehicles, RSUs or with a UE 112 held by pedestrian 114 using direct communication links. For example, UE 102 may communicate with UE 112 via V2V communication link 113, UE 104 may communicate with UE 112 via V2V communication link 115, and UE 110 may communicate with UE 112 via V2I communication link 117.

During direct communications with one or more entities in the V2X wireless communication system 100, each entity may provide V2X information, such as an identifier for the V2X entity, as well as other information in messages such as Common Awareness Messages (CAM) and Decentralized Notification Messages (DENM) or Basic Safety Message (BSM), which may be used for, e.g., ADAS or safety use cases.

In other implementations, UE 102 and UE 104 may indirectly communicate with each other, e.g., through the RSU 110 via the V2I communication links 107 and 109, respectively or through other network infrastructure (not shown), e.g., e.g., using cellular vehicle-to-everything (CV2X). For example, vehicles may communicate via a base station in a Radio Access Network (RAN), such as an evolved Node B (eNB) or next generation evolved Node B (ng-eNB) in LTE wireless access and/or evolved LTE (eLTE) wireless access or a NR Node B (gNB) in Fifth Generation (5G) wireless access.

UEs 102 and 104 may initiate and perform ranging/positioning sessions, including sending pre-PRS messages, broadcasting PRS, and sending post-PRS messages on links 103, 107, 109, 113 or 115, with which the range or relative positions between UEs 102 and 104 may be determined. The PRS broadcast by UEs 102 and 104 may be any signal suitable for ranging, e.g., as defined for DSRC or C-V2X. The PRS may be broadcast on licensed or unlicensed spectrum. For example, in some implementations, PRS may be broadcast on one or more Unlicensed National Information Infrastructure (UNIT) radio bands including, for example, one or more of the UNII-1 radio band, the UNII-2A radio band, the UNII-2B radio band, or the UNII-3 radio band. When broadcasting on unlicensed spectrum, listen-before-transmit (LBT) protocols may be employed.

Where UEs 102 and 104 broadcast PRS in a V2V link 103, the range or relative positions between UEs 102 and 104 may be determined directly. Where UE 102 and 104 broadcast PRS in V2I links 107 and 109 or via links 113 and 115, the range or relative positions between UE 102 and UE 110 or UE 112 and between UE 104 and UE 110 or UE 112 may be determined directly.

The direct wireless communications between the UE 102 and 104 and UE 110 and UE 112, do not require any network infrastructure and enable low latency communications, which is advantageous for precise ranging or positioning. Accordingly, such direct wireless communications may be desirable for ranging over short distances, e.g., with nearby vehicles or infrastructure.

The UEs, e.g., any of V-UE 102, V-UE 104, RSU 110, and UE 112, shown in FIG. 1, may be configured to perform ranging and/or positioning operations, such as RTT-based ranging.

Figure 2:
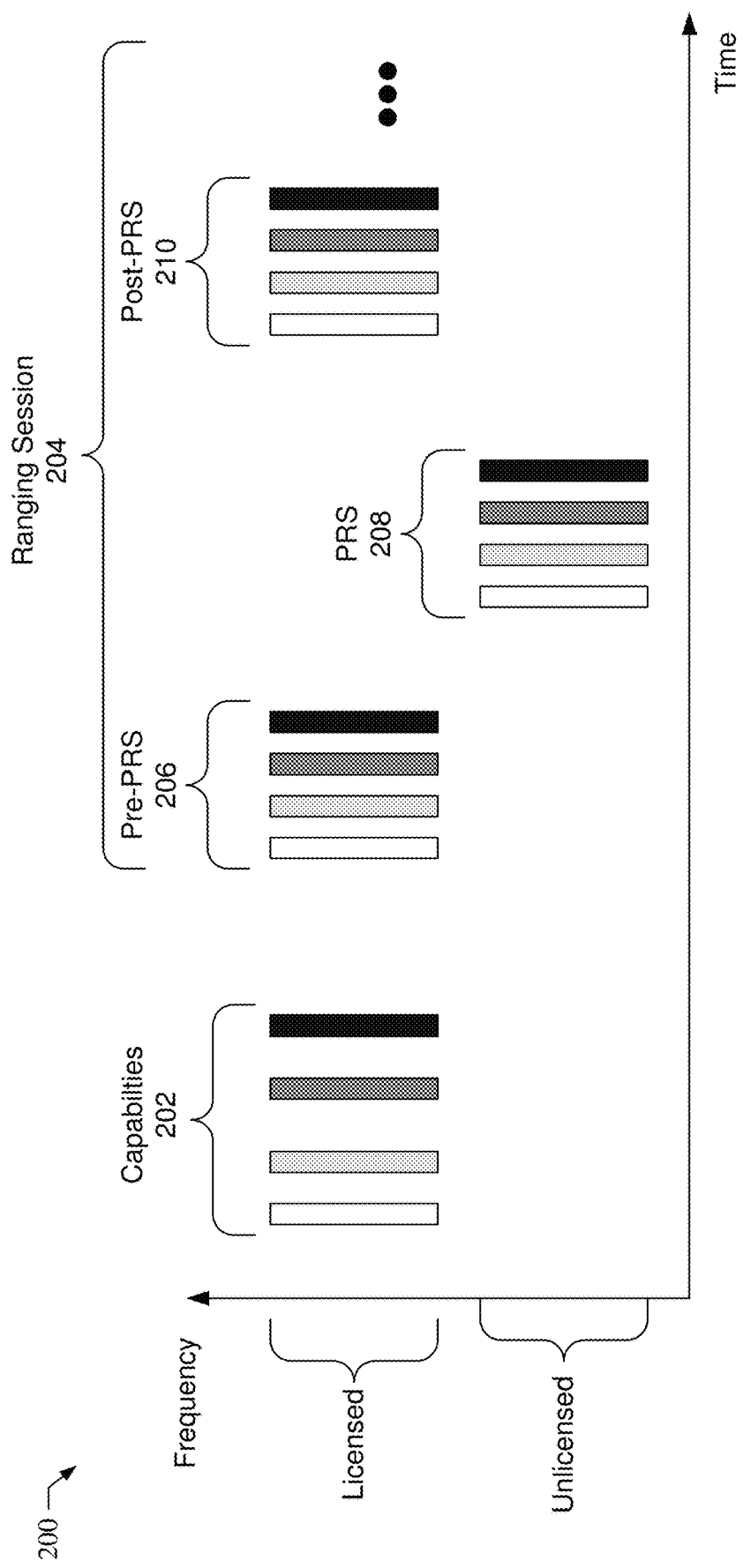
FIG. 2 illustrates a signaling graph indicating the timing and frequencies of various messages that may be sent and received by an initiator UE and three responder UEs for a ranging or positioning session.

FIG. 2 illustrates, by way of example, a signaling graph 200 indicating the timing and frequencies of various messages that may be sent and received by an initiator UE and three responder UEs for a ranging or positioning session. For example, FIG. 2 illustrates an RTT-based ranging session 204, during which a number of messages are sent between an initiator UE and responder UEs, including pre-PRS messages 206 to request and accept a ranging session, the PRS signals 208 for measurement, and post-PRS messages 210 to exchange measurement payloads. In FIG. 2, the signaling from the initiator UE is illustrated with white boxes, signaling from a first responder UE is illustrated with grey boxes, signaling from a second responder UE is illustrated with hatched boxes, and signaling from a third responder UE is illustrated with black boxes.

As illustrated, the UEs, including the initiator UE and responder UEs, may broadcast capabilities messages 202. The capabilities messages are not part of the ranging session but may include information that may be used by the initiator UE to initiate a ranging session with selected UEs. For example, the capabilities message may include the UE ID, the ranging capability of the UE, the channel that the UE is configured to use, etc. The capabilities message may additionally indicate whether the UE needs to determine its position or if its position is known and it may serve as an anchor UE for positioning other UEs. It should be understood that while FIG. 2 illustrates the capabilities messages 202 as having the same order as the messages in the ranging session 204, the order may, in fact, differ.

The pre-PRS messages 206 (e.g., pre-ranging messages) are used by the UEs to request and acknowledge a ranging session. As illustrated, the pre-PRS messages 206 may be transmitted on a licensed spectrum to guarantee reliability. The pre-PRS messages 206 may be broadcast or unicast, e.g., with Radio Resource Control (RRC) connections. The initiator UE broadcasts an initial pre-PRS message 206 (illustrated by the white box) to indicate the ranging session between the initiator UE and the responder UEs and which may provide information for the ranging session. For example, the pre-PRS message 206 from the initiator UE, may include IDs for participating UEs, i.e., the initiator and responder IDs. The pre-PRS message may include the PRS ID that will be used by the initiator UE, and in some implementations, the PRS ID to be used by the responder UEs. If the PRS ID will be fixed over multiple PRS exchanges (e.g., for multiple units in the ranging session 204), the initiator UE may include an ID associated with the current PRS exchange, e.g., a session ID. The initiator UE may determine when the PRS signals 208 will be transmitted, which, for example, may be configured from an upper layer in the initiator UE. The initiator UE may indicate the timing of the PRS by sending the time slot number nears to the desired PRS transmission time. In some implementations, the time slot may be subject to local clock error. In some implementations, the initiator UE may further provide the timing of PRS to be sent by the responder UEs. The initiator UE may further indicate the frequency that will be used to broadcast the PRS signal 208 by the initiator UE. For example, the frequency of PRS may be selected from an available set of total bandwidths or the frequency of PRS may be selected by sensing the interference and choosing one or more channels whose average interference Reference Signal Receive Power (RSRP) is less than a threshold. The initiator UE may indicate the number of PRS cycles that it will execute during the ranging session 204. The number of PRS cycles may be configured from an upper layer. The pre-PRS message for each PRS cycle, for example, may indicate the current PRS cycle with respect to the total PRS cycles requested, where the number of the current cycle increments after completion of each cycle.

The initial pre-PRS message from the initiator UE is received and decoded by the responder UEs, which are identified in the initial pre-PRS message. The responder UEs may send responding pre-PRS messages 206 (illustrated with grey, hatched, and black boxes) acknowledging the initial pre-PRS message, which may additionally provide information for the ranging session. For example, each responder UE may determine the timing of its PRS signal 208, e.g., based on the PRS timing of the initiator UE plus a delay, which may be based on hardware constraints and the interference level, and the number and order of responder UEs. For example, the delay may be relatively low when the PRS processing time is small and ambient interference is low and may be relatively high when the PRS processing time is high and ambient interference is high. The responder UE may indicate the determined time of its PRS by sending the time slot number nears to the determined PRS transmission time. In some implementations, the time slot may be subject to local clock error. Each responder UE may indicate the PRS ID that it will use or may indicate that it will use the PRS ID that was indicated in the initial pre-PRS message. If the PRS ID will be fixed over multiple PRS exchanges (e.g., multiple PRS cycles in the ranging session 204), the responder UE may include the ID associated with the current PRS exchange, e.g., a session ID, that was received in the initial pre-PRS message from the initiator UE. Each responder UE may further indicate the frequency that will be used to broadcast its PRS signal 208. The responder UEs may broadcast the pre-PRS messages 206, which may be received by the initiator UE (and other responder UEs). In some implementations, each responder UE may transmit the pre-PRS message 206 using unicast with RRC connection to the initiator UE.

The PRS signals 208 are exchanged by the participating UEs. The initiator UE and responder UEs know the expected timing of the PRS signals and know the PRS ID (and any session ID used with the exchanged) as well as the frequency that is used to broadcast the PRS signals 208. The PRS signals 208 may be broadcast on an unlicensed spectrum, which may be subject to LBT constraints. For example, the initiator UE broadcasts its PRS signal 208 (shown with the white box) at the determined time that was indicated in the initial pre-PRS message 206. In some implementations, the initiator UE broadcasts its PRS signal at the determined time plus a random waiting time due to the LBT constraints when the PRS signal is deployed in the unlicensed spectrum. In some implementations, the LBT may be a Category 2 LBT with a fixed window Clear Channel Assessment (CCA) or a Category 4 LBT with a varying window CCA. The initiator UE uses the PRS signal that corresponds to the PRS ID and uses the frequency resources that were indicated in its initial pre-PRS message 206. The initiator UE saves the time instance that the PRS signal is broadcast, and the responder UEs save the time instance that the PRS signal is received. In some implementations, the time instances may be subject to local clock error.

Similar to the initiator UE, each responder UEs broadcast its PRS signal 208 (shown with the grey, hatched, and black boxes) at the determined time that was indicated in the initial pre-PRS message 206. at the determined time that it indicated in the pre-PRS message 206 (or that was assigned by the initial UE). In some implementations, each responder UE may broadcast its PRS signal at the determined time plus a random waiting time due to the LBT constraints when the PRS signal is deployed in the unlicensed spectrum. In some implementations, the LBT may be a Category 2 LBT with a fixed window CCA or a Category 4 LBT with a varying window CCA. Each responder UE uses the PRS signal that corresponds to the PRS ID and uses the frequency resources that were indicated in its pre-PRS messages 206. Each responder UE saves the time instance that its PRS signal is broadcast, and the initiator UE (and optionally other responder UEs) save the time instance that the PRS signal is received. In some implementations, the time instances may be subject to local clock error.

Thus, each UE records the time of departure (ToD) of its broadcast PRS signal and measures the time of arrival (ToA) of the PRS signal received from the other UEs. The PRS signal may be any signal suitable for ranging, e.g., as defined for DSRC or C-V2X. The PRS signal, for example, is a pseudo-noise (PN) sequence. The ToA and ToD resolution of the PRS signals increase with an increased frequency bandwidth. In some implementations, the angle of departure (AoD) and angle of arrival (AoA) of the broadcast and received PRS signals may also be measured. Broadcasting on an unlicensed spectrum is advantageous as a wider frequency band is available. For example, in some implementations, PRS may be broadcast on one or more UNII radio bands including, for example, one or more of the UNII-1 radio band, the UNII-2A radio band, the UNII-2B radio band, or the UNII-3 radio band.

The post-PRS messages 210 are sent by each UE to exchange measurement payloads. As illustrated, the post-PRS messages 210 may be transmitted on a licensed spectrum to guarantee reliability. In some implementations, the post-PRS messages 210 may be broadcast or unicast with RRC connection. The initiator UE sends its post-PRS message 210 (shown with the white box) and indicates when it broadcast the PRS signal 208 (ToD) and when the PRS signals from the responder UEs were received (ToA). In some implementations, the ToA may be computed as a relative time with respect to the ToD of its broadcast PRS signal, and the relative time may be provided. In some implementations, the relative time may be approximated to the closest multiple of time scale shared by the initiator UE and the responder UEs. In some implementations, the initiator UE may provide an indication of its location in the post-PRS message 210, if known. For example, the location of the initiator UE may be the location at a specific time, such as the broadcast time of its PRS signal or the arrival time of the PRS signal from a responder UE. The post-PRS message 210 may further include the orientation of initiator UE, a broadcast indicator of the PRS signal 208, a reception indicator of PRS from the responder UEs, as well as other related measurements, e.g., including map information, the locations of reflectors with respect to the UE, etc.

Similar to the initiator UE, each responder UEs sends its post-PRS signal 210 (shown with the grey, hatched, and black boxes) to provide the measurement payloads. Each responder UE may indicate whether it received the PRS signal from the initiator UE and may indicate when it broadcast the PRS signal 208 (ToD) and when the PRS signals from the initial UE (and optionally from other responder UEs) was received (ToA). In some implementations, the ToD may be computed as a relative time with respect to the ToA of the PRS signal from the initiator UE (and optionally with respect to the ToA of the PRS from other responder UEs). In some implementations, the relative time may be approximated to the closest multiple of time scale shared by the initiator UE and the responder UE. In some implementations, the responder UE may provide an indication of its location in the post-PRS message 210, if known. For example, the location of the responder UE provided may be the location at a specific time, such as the arrival time of PRS signal from the initiator UE or the departure time of its broadcast PRS signal. The post-PRS message 210 may further include the orientation of responder UE, a broadcast indicator of the PRS signal 208, a reception indicator of PRS from the initiator UE and other responder UEs, as well as other related measurements, e.g., including map information, the locations of reflectors with respect to the UE, etc.

The time between the first pre-PRS message 206 and the last post-PRS message 210 may be the duration of the ranging session and may be, e.g., 100 msec. In some implementations, multiple instances of pre-PRS messages 206, PRS 208, and post-PRS messages 210, may be used in a single ranging session 204 to provide higher accuracy.

Both the initiator UE and the responder UEs may determine the range between itself and each other UE in the ranging session based on the ToD and the ToA of the broadcast PRS signals. For example, the RTT between any pair of UEs (which may be any pair of initiator and responder UEs) may be determined based on the $ToD_i$ and $ToA_i$ for the $PRS_i$ signals (where i=1 for PRS broadcast from a first UE and i=2 for PRS broadcast by a second UE), as the difference between the $ToD_1$ and $ToA_2$ minus the difference between the $ToA_1$ and the $ToD_2$, e.g., as follows.

$$RTT=(ToD_1-ToA_2)-(ToA_1-ToD_2) \qquad \text{eq. 1}$$

The RTT value is the round trip time for the signal, and thus, the range (distance) between the $UE_1$ and $UE_2$ may be determined as RTT/2c, where c is the speed of light.

If the position of one or more responder UEs is known, the range between the initiator UE and the responder UEs may be used along with the known position of the one of the responder UE to determine the position of the other UE, and thus, the ranging session may be a positioning session. The responder UEs with known positions that may be used for positioning may sometimes be referred to herein as anchor UEs. The positions of anchor UEs may be provided to other UEs through messaging, e.g., in the pre-PRS messages or in the post-PRS messages. If the range to multiple anchor UEs is determined, the positions of the multiple anchor UEs may be used in multilateration to determine the position of the initiator UE (or other responder UEs).

The angle measurements, e.g., AoD, and AoA, may be used, e.g., for assistance in positioning. By way of example, based on the range between two UEs and a measured AoA, the relative positions of the two UEs may be determined. With the relative positions of the UEs determined, if the actual position of one of the UEs is known (which may be provided, e.g., in the pre-PRS messages 206 or post-PRS messages 210), the actual position of the other UE may be determined. If the position of two UEs are known by a third UE, the ranges between the third UE and each of the other two UEs will produce two possible positions for the third UE, which may be resolved based on AoD/AoA information. The AoD may be useful if the resolution of the AoA is poor or incorrect, for example. AoD may be measured, e.g., based on a known orientation of the UE (for example, determined by a magnetometer), and the direction of the transmitted signal relative to the UE (e.g., relative to an antenna array of the UE used for beamforming). The AoA may be measured based on the phase difference of a received signal at different antenna elements of an antenna array and the known orientation of the UE, for example determined by a magnetometer). Additionally, geographic constraints may be used to assist in positioning, for example, by constraining possible positions of a vehicle based on positions that are accessible to a vehicle, such as a road.

As discussed above, the post-PRS messages may include a large payload including ToD of the broadcast PRS signal and ToA of multiple received PRS signals, the location of the UE, etc. As the number of UEs participating in the ranging session increases, the number of broadcast post-PRS messages will increase along with the size of the payload in each post-PRS message, and thus may be a significant contributor to the overhead in the positioning session. Moreover, in some instances, the post-PRS message provided by some responder UEs may not significantly improve the range or position information of the initiator UE. For example, if anchor UEs are clustered together in approximately the same location, then the extra information provided by the post-PRS messages from one or more of the clustered anchor UEs may not provide a significant improvement in the positioning accuracy for the initiator UE.

Figure 3:
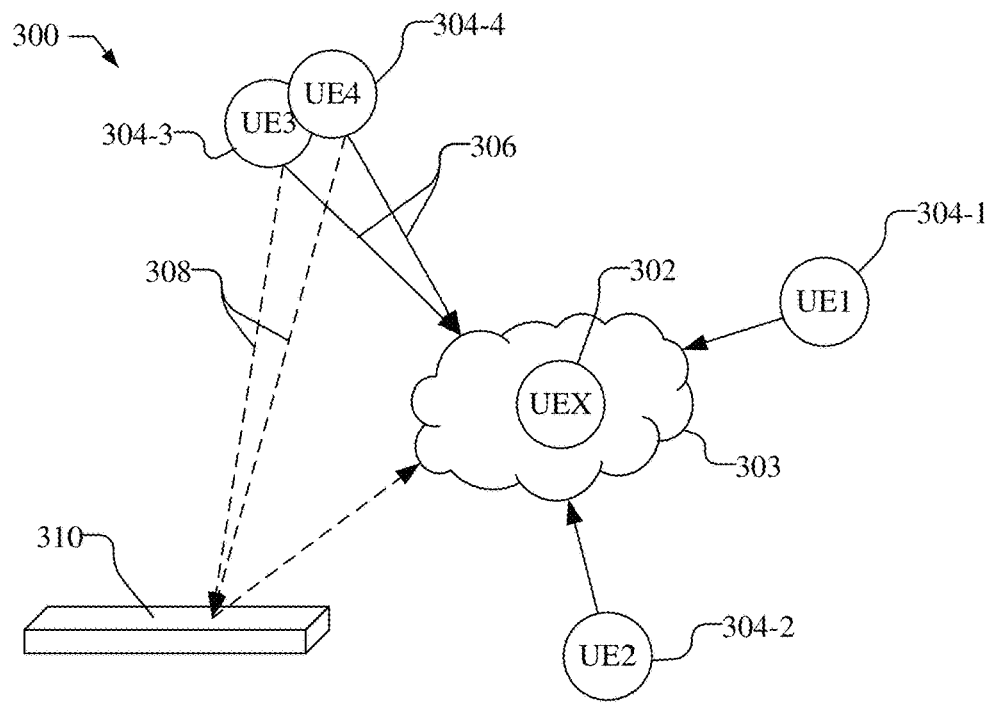
FIG. 3 illustrates a simplified environment for a positioning session that includes an initiator UE and responder UEs with two responder UEs having similar signaling characteristics.

FIG. 3 illustrates a simplified environment 300 that includes an initiator UEX 302 and four responder UEs, e.g., UE1 304-1, UE2 304-2, UE3 304-3, and UE4 304-4 (sometimes collectively referred to as responder UEs 304). The position of UEX 302 is unknown (as indicated by the cloud 303 surrounding UEX 302), while the positions of the responder UEs 304 is known, e.g., UEs 304 may be RSUs or stationary vehicle UEs with accurate GNSS. The responder UEs 304 may server as anchor UEs for positioning of the initiator UEX 302. The initiator UEX 302 may initiate a ranging/positioning session by sending pre-PRS messages to the responder UEs 304.

As illustrated, responder UE3 304-3 and UE4 304-4 are physically close together, and consequently PRS signals transmitted by UE3 304-3 and UE4 304-4 will likely experience similar signal characteristics. For example, PRS signals broadcast by UE3 304-3 and UE4-304-4 will likely have the same line of sight (LOS) travel distance (indicated by arrows 306), the same non-line of sight (NLOS) multipath conditions due to, e.g., a reflector 308, and illustrated by the dotted arrows 310, and the same blockage conditions, etc. Similarly, a PRS signal broadcast by UEX 302 will experience similar signal characteristics when received by the responder UE3 304-3 and UE4 304-4, e.g., the same LOS travel distance, the same NLOS multipath conditions and blockage conditions.

The initiator UEX 302 and responder UEs 304 will broadcast post-PRS messages that include measurement information for the broadcast and received PRS signals. In general, the initiator UEX 302 may be moving, e.g., the UEX 302 may be in a moving vehicle and multiple ranging/positioning sessions (or PRS cycles) may be performed over some duration.

Because the responder UE3 304-3 and UE4 304-4 are physically close and, thus, broadcast signals as well as received signals will experience similar signal characteristics. Accordingly, the information that may be provided by UE4 304-4 in its post-PRS message may be only marginally useful if the information provided by UE3 304-3 has already been processed.

Figure 4:
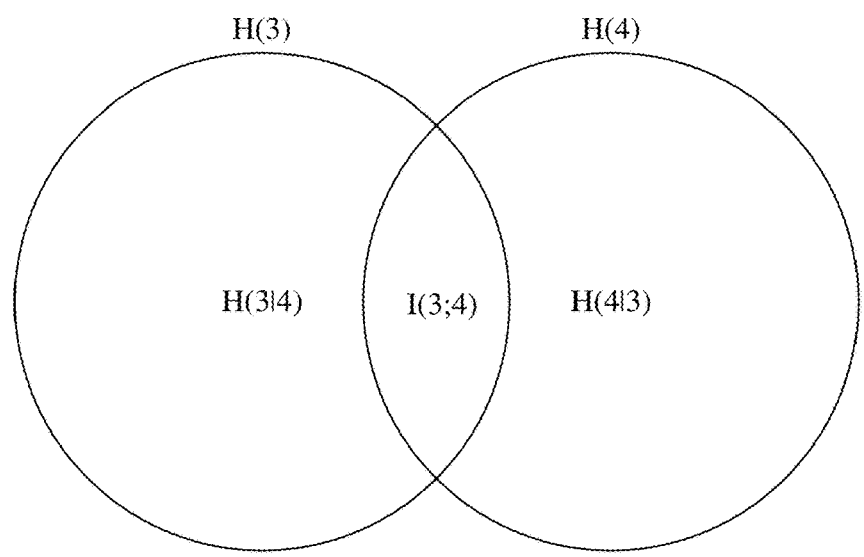
FIG. 4 graphically illustrates entropy notation H(A) for the responder UEs that provide similar information for positioning.

FIG. 4 graphically illustrates entropy notation H(A) for a random variable A, H(B) for random variable B, and I(A,B) denotes the mutual information between random variables A and B, for the UE3 304-3 and UE4 304-4 from FIG. 3. Using information theoretic notation, H(3)−H(3|4)≅0; H(4)−H(4|3)≅0; I(3,4)≅0, then the newly added information provided the additional responder UE is marginalized.

Accordingly, in implementations discussed herein, one or more responder UEs that provide only marginalized information in a positioning session may be determined and information from such responder UEs is excluded from subsequent positioning sessions (or, equivalently, future PRS cycles) to reduce signaling overhead and improve efficiency. The marginalized information may be detected, for example, based on a comparison of a positioning accuracy levels achieved using various subsets of anchor UEs, where subsets may include a full set of anchor UEs and a plurality of proper subsets of anchor UEs, where proper subsets include less than the full set of anchor UEs. For example, a proper subset of responder UEs that produces a positioning accuracy that is within a predetermined threshold of the positioning accuracy achieved using all of the responder UEs may be identified and used to determine an anchor UE that is providing marginalized information and that may be excluded from subsequent positioning sessions. For example, the initiator UE may exclude a selected anchor UE by not including the anchor UE in pre-PRS messages for subsequent positioning sessions or, alternatively, may include the anchor UE in the pre-PRS messages but may also provide an indication that the anchor UE will not transmit its post-PRS message (and optionally other signals or messages) during the positioning session.

An initiator UEX may have multiple PRSs from the same anchor UEs (e.g., UE1, UE2, and UE3) over a few time slots. For example, the UEX may be slowly moving and engaging in positioning sessions with the same anchor UEs (e.g., RSUs). A new anchor UE4 (e.g., RSU or UE with a known position) may become visible and may be included in the positioning sessions by the initiator UEX. The information provided by the new anchor UE4 in its post-PRS message (sometimes referred to herein as new input) will likely enhance the position calculation for the initiator UEX but may produce only a marginal improvement.

FIG. 5A is a table illustrating an example of the incremental improvement of a position estimate (x,y) for the UEX based on the information provided in the post-PRS messages from the anchor UEs: UE1, UE2, UE3, UE4, where UE4 may be a new anchor UE. For example, with only a single anchor UE (UE1), the estimated position of the initiator UEX has a relatively large uncertainty (16-19, 6-8), and that by including the information from additional anchor UEs, the uncertainty decreases. In the present example, with the post-PRS information from UE1+UE2+UE3, the initiator UEX achieves a relatively precise position estimate (17.5, 7), and adding the new anchor UE4 only marginally improves the position estimate (17.5,6.8).

FIG. 5B is another table, similar to the table shown in FIG. 5A, but illustrates an example of the incremental improvement of a position estimate (x,y) for the UEX that may be generated by an Extended Kalman Filter (EKF), as may be used by the initiator UEX. The table of FIG. 5B, for example, shows the improvement in the position estimate that may be achieved using post-PRS information from an increasing number of anchor UEs, and also shows the resulting sigma values, e.g., the estimation covariance, which may be treated as the uncertainty of the estimated position. As illustrated, the sigma value incrementally decreases as information from additional anchor UEs is included in the input to the EKF. In the present example, with the post-PRS information from UE1+UE2+UE3, a relatively precise sigma value (0.5,1) is achieved and adding the new anchor UE4 only marginally decreases the sigma value (0.45,0.8).

The initiator UEX may be configured to determine position estimates for various subsets of the anchor UEs every time PRS signals are exchanged (e.g., in each positioning session or equivalently every PRS cycle) and to determine how the accuracy level of the position estimate is affected using post-PRS information from different subsets of anchor UEs. By way of example, initiator UEX may generate a position estimate using all available anchor UEs (UE1, UE2, UE3, UE4), i.e., all anchor UEs that return a post-PRS message with usable information, and may generate position estimates for various subsets of anchor UEs. In some implementations, each subset of anchor UEs used by the initiator UEX may be limited to subsets of N-1 anchor UEs, where N is the number of available anchor UEs. For example, in the present example, the initiator UEX may generate position estimates and corresponding accuracy levels for subsets of anchors that include (UE1, UE2, UE3), (UE1, UE2, UE4), (UE1, UE3, UE4), and (UE2, UE3, UE4). In other implementations, the initiator UE may be configured to use other numbers of anchor UEs in the subsets of anchor UEs, e.g., 1 to N-1 anchor UEs, to produce position estimates and corresponding accuracy levels. In this example, the initiator UEX may have $2^N-1$ different ways of generating subsets of anchor UEs for a number N of available anchor UEs.

The accuracy level, which may be a confidence level or a covariance estimation, for the position estimates may be determined. The accuracy level may be determined based on a relative comparison to the results generated using the full number of anchor UEs. For example, the accuracy level may be determined by comparing the position estimate produced by each subset of anchor UEs to the position estimate produced by the full number of anchor UEs. Where an EFK is used for position estimation, the accuracy of the estimation may be the covariance estimation (sigma). In another example, the accuracy level may be determined by comparing the position estimate covariance derived from a subset of anchor UEs to the position estimate covariance derived from a full available set of anchor UEs to the UE.

The effect on the accuracy level of the position estimate by excluding one or more anchor UEs may be determined by comparing the accuracy level produced by each subset of anchor UEs to the accuracy level produced by the full number of anchor UEs. In some implementations, the accuracy level produced by each subset of anchor UEs may be compared to the accuracy level produced by the remaining subsets of anchor UEs to determine which subset has the highest accuracy level. In some implementations, a predetermined threshold may be used to identify subsets of anchor UEs with an acceptable accuracy level. For example, the differences between the accuracy levels produced by the subset of anchor UEs and the full number of anchor UEs may be compared to the predetermined threshold to determine if the difference is below the predetermined threshold, indicating that the subset of anchor UEs produces an acceptable accuracy level. The one or more anchor UEs that are not included in the subset of anchor UEs that produce the acceptable accuracy level, thus, produce only a marginal improvement to the position estimate and may be selected to be excluded from subsequent positioning sessions.

Thus, for each different subset of anchor UEs, the initiator UEX may perform a threshold test for the accuracy level. For example, referring to FIG. 5B, for the full set of anchor UEs {UE1, UE2, UE3, UE4}, the estimated position is (17.5,6.8) and the covariance estimation (sigma) or uncertainty is (0.45,0.8). For a subset of anchor UEs {UE1, UE2, UE3}, the position estimate is (17.5,7) and the covariance estimation (sigma) or uncertainty is (0.5,1). For another subset of anchor UEs {UE1, UE2, UE4} (not shown in FIG. 5B), the position estimate is (17.5,7) and the covariance estimation (sigma) or uncertainty is (0.5,1). If the estimation output and estimation covariance are the same compared to full set of inputs {UE1, UE2, UE3, UE4} for the initiator UEX, then the input from UE3 and the input from UE4 contribute the same amount. In other words, they are sufficient statistics in the Kalman filter framework (linear estimation theory). Accordingly, either UE3 or UE4 may stop transmission of the post-PRS message without significantly affecting the accuracy level of the resulting position estimate.

The initiator UEX may be configured to select an anchor UE, e.g., either UE3 or UE4, to halt the PRS signal transmission and the post-PRS message transmission. For example, the initiator UEX exclude the selected anchor UE, e.g., UE4, in the pre-PRS message of the next positioning session. Alternatively, the initiator UEX may trigger the selected anchor UE, e.g., UE4, but may disable its signaling, e.g., halt transmission of the post-PRS message and optionally the PRS signal, using extra signaling or an indication in the pre-PRS message. After a period of time and/or after the initiator UEX moves by a predetermined amount, the initiator UEX may revoke the exclusion of the selected anchor UE, e.g., by including the selected anchor UE in pre-PRS messages or by removing the indication to disable its signaling in the pre-PRS message or using extra signaling.

Figure 6:
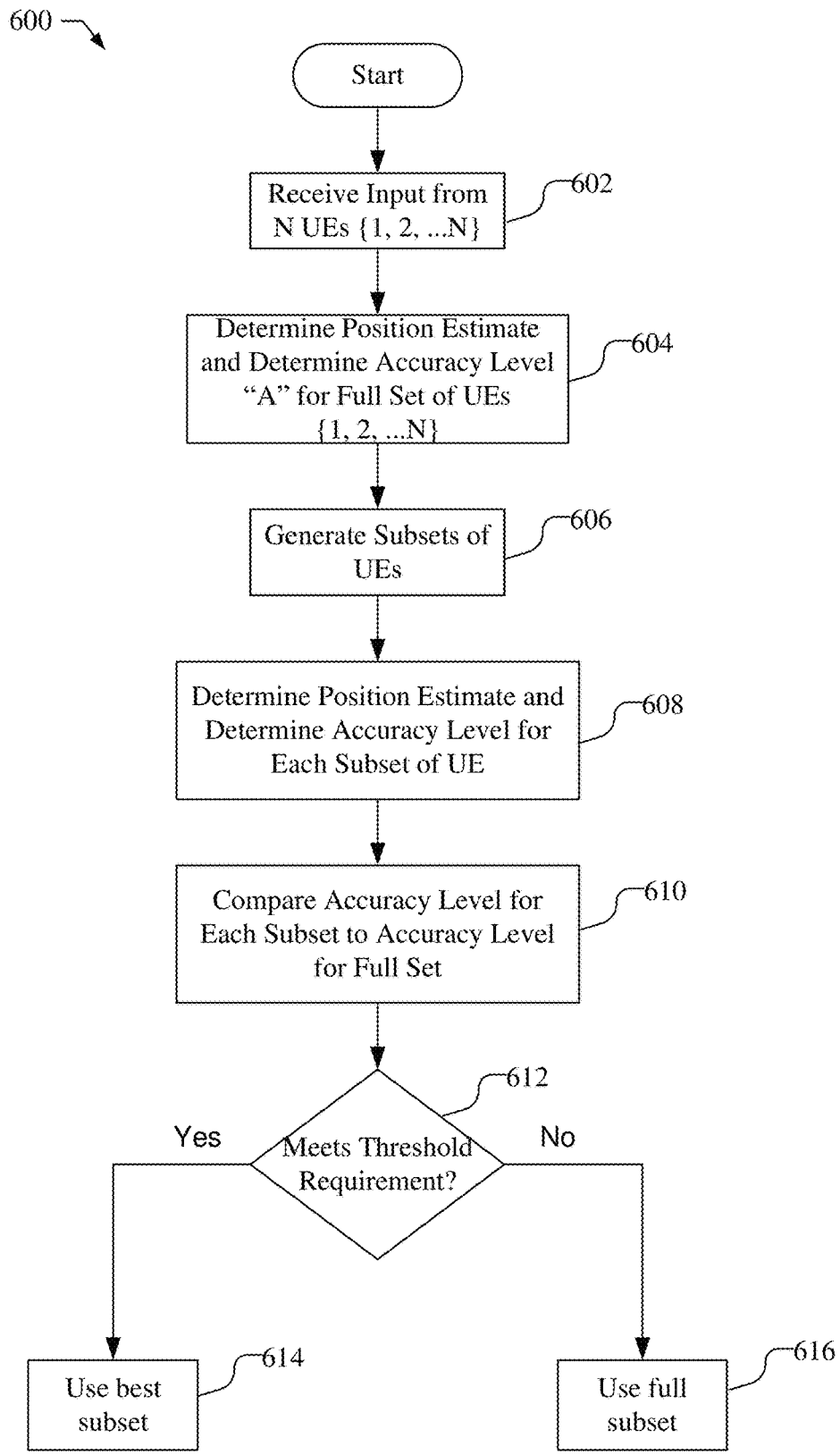
FIG. 6 is a flow chart illustrating a process in which an initiator UE may detect marginalized information from anchor UEs in a positioning session and exclude selected UEs in subsequent positioning sessions to reduce signaling overhead and improve efficiency.

FIG. 6, by way of example, is a flow chart 600 illustrating the process in which an initiator UE may determine marginalized information in a positioning session that uses ranges and exclude information from selected UEs in subsequent positioning sessions to reduce signaling overhead and improve efficiency.

At block 602, the initiator UE receives input, e.g., via the post-PRS messages from a number N of anchor UEs {1, 2, . . . N} in a positioning session.

At block 604, the initiator UE determines the position estimate and a scalar value indicating the accuracy level "A" using the input from the full set of anchor UEs {1, 2, . . . N}. As discussed above, the position estimate may be determined based on the range to the UEs and known positions of the anchor UEs and the corresponding accuracy level for the position estimate may be determined based on the covariance estimation (sigma) from the EKF or in other manners. The covariance values are for each state variable. For example, when estimating location in $\hat{X}$ and $\hat{Y}$ coordinates, then there may be a covariance for $\hat{X}$ (e.g., cov($\hat{X}$)) and covariance for Y (e.g., cov($\hat{Y}$)). On the other hand, when performing only ranging, the result is a distance estimate d and the corresponding covariance cov($\hat{d}$). For ranging, a scalar value indicating the accuracy level, may be given by multiplying the covariance for $\hat{X}$ and covariance for Y or any weighted average function of cov($\hat{X}$) and cov($\hat{Y}$).

At block 606, the initiator UE may generate proper subsets of the UEs. As discussed above, the number of UEs in each subset of UEs may be limited to N-i UEs, where i=1 or 0<i<N, or any other desired value between 0 and N. In some implementations, the procedure 600 may be an iterative process, where i=1 in the first iteration, and if unsuccessful, is repeated with i=i+1 with i<N.

At block 608, the initiator UE determines the position estimate and a scalar value indicating the corresponding accuracy level "C" using the input received for each subset of UEs. Similar to block 604, and as discussed above, the position estimate for each subset of UEs may be determined based on the range to the UEs and known positions of the anchor UEs and the corresponding accuracy level for the position estimate may be determined based on the covariance estimation (sigma) from the EKF, where each different subset of anchors will produce a distinct X and Y corresponding cov($\hat{X}$) and cov($\hat{Y}$).

At block 610, the accuracy level C associated with the position estimate produced by the input from each subset of UEs is compared to the accuracy level A produced by the input from the full set of UEs. The comparison of accuracy levels C and A, for example, may be a simple function, e.g., a difference or ratio of the scalar values of the accuracy levels C and A, e.g., C/A.

At block 612, the accuracy level comparison may be compared to a predetermined threshold, e.g., to find the best subset of UEs. For example, the ratio of the scalar values C/A may be compared to a predetermined threshold, e.g., 0.9. The predetermined threshold may be set based on the accuracy requirement of the positioning session and the desire to reduce overhead and improve efficiency. For example, if accuracy is paramount and overhead or efficiency is not a consideration, e.g., in an emergency positioning session, then the predetermined threshold may be 1.0. On the other hand, if overhead or efficiency is an important consideration, the predetermined threshold may be lowered. In some implementations, the accuracy comparison may be required to be greater than the predetermined threshold. In other implementations, the accuracy comparison may be required to be equal the predetermined threshold, which may be a threshold rang, e.g., if it is desirable to require the reduction in the number of UEs that are used in the positioning session, e.g., to reduce overhead. In this implementation, an iterative process in which the number of UEs in each subset of UEs (N-i) is decreased after each unsuccessful iteration, such as discussed in block 606, may be used in this implementation.

If the accuracy level comparison for one or more subsets of UEs meets the threshold requirement in block 612, the best subset of UEs is determined in block 614. In some implementations, the proper subset of UEs with an accuracy level that is closest to the accuracy level of the full set of UEs may be determined to be the best subset of UEs. For example, in some implementations, the threshold step of block 612 may be skipped and the proper subset of UEs with the closest accuracy level to the full set of UEs may be the best subset. In another example, if more than one subset of UEs meets the threshold requirement, the subset of UEs with the greatest accuracy level may be determined to be the best subset. In other implementations, other considerations may be used to determine the best subset of UEs. For example, considerations for best subset of UEs may be based on subsets that include UEs that are likely to stay visible longest, which may be determined based on signal strength (or change in signal strength over time), or the newest UEs added to the ranging sessions, etc. Other considerations that may be the type of UE in the subsets, e.g., RSUs may be more desirable than vehicle UEs. Once the best subset of UEs is determined, the UEs that are to be excluded from subsequent ranging sessions may be selected based on the UEs that are not included in the best subset of UEs.

If the accuracy level comparison for one or more subsets of UEs does not meet the threshold requirement in block 612, the full subset of UEs may be used in subsequent positioning sessions in block 616. Alternatively, as discussed above, blocks 606, 608, 610, and 612 may be iteratively repeated with a smaller number of UEs in each subset of UEs, until either a best subset of UEs is determined at block 614, or no satisfactory subset of UEs is determined and the full subset of UEs is used in subsequent positioning sessions in block 616.

The threshold testing process shown in FIG. 6 is based on the position estimation output and uncertainty or accuracy level, e.g., covariance estimation (sigma). The same or similar process may be used for any UE-based positioning technique that the initiator UE may implement. For example, regardless of positioning technique used, the output generated using the input from different subsets of UEs may be compared to the output generated using the input from the full set of UEs, and best subset of UEs may be found based on the comparison. The best subset of UEs, for example, may be determined as the proper subset of UEs that provides inputs that produce the best output relative to the full set of UEs. In some implementations, the best output may be required to be better than a predetermined threshold to assure that a significant change in the output does not occur.

The above-described process may be related to ranging sessions with one initiator UE with an unknown location, and the other participating UEs have known locations, i.e., all responder UEs are anchor UEs. In some implementations, however, the process may be generalized to ranging sessions, where the ranging sessions are merged or optimized to derive the position of two or more UEs. For example, the location of the initiator UEX and one or more responder UEs (e.g., UEY) may be unknown and may be required to be determined. In such an implementation, the post-PRS transmission of a responder UE, e.g., responder UE4, may be halted (i.e., the UE4 is excluded from subsequent ranging sessions) only if the threshold testing results in selection of responder UE4 for exclusion for both UEX and UEY. If the threshold testing results in selection of responder UE4 for UEX but results in selection of a different responder UE, e.g., UE3, for UEY, then both responders UE3 and UE4 will continue to participate in the positioning sessions.

FIG. 7 illustrates a table showing examples of position estimates and corresponding accuracy levels for UEX and UEY for a full set of responder UEs and proper subsets of the UEs. The positions of UEX and UEY are unknown and may be estimated, along with corresponding accuracy levels, for the various subsets of UEs. If the resulting accuracy levels for UEX and UEY result in the same proper subset of UEs being determined to be the best subset of UEs, e.g., subset (UE1, UE2, UE4), then the remaining UEs, e.g., UE3, may be selected to be excluded from participation in subsequent positioning sessions. On the other hand, if the resulting accuracy levels for UEX and UEY result in different subsets of UEs being determined to be the best subset of UEs, e.g., subset (UE1, UE2, UE4) for UEX and (UE1, UE2, UE3) for UEY, then the best subsets of UEs do not match and no responder UEs may be excluded from participation in subsequent positioning sessions.

In some implementations, a single initiator UE, e.g., UEX, may determine whether the threshold testing results in selection of the responder UE for both UEX and UEY. In this implementation, the UEX performs the threshold test for itself as well as for the responder UEY. In other implementations, each UE with an unknown location, e.g., UEX and UEY, will independently perform the threshold test for itself. Each UE may provide an indication (e.g., in the pre-PRS or a separate message) to any responder UE that it believes should be excluded from subsequent positioning sessions and not transmit post-PRS messages and optionally not transmit PRS signals. In this implementation, for example, if responder UE3 receives an indication from UEX that it should not transmit post-PRS messages, responder UE3 will not halt the post-PRS transmissions unless it also receives the same request from UEY. Thus, the anchor UEs may be configured to halt transmission of post-PRS message if and only if it receives an indication to halt transmissions from all position requesting UEs that are participating in the positioning session.

Thus, the threshold testing process may be used to classify and remove any post-PRS messages from responder UEs that are not significantly contributing to the final position estimate for a UE seeking position estimates in positioning sessions. The expense of positioning calculations for multiple subsets of UEs provides the benefit of reducing the overhead of post-PRS transmissions in the positioning sessions. The benefit, for example, may be particularly effective when the number of anchor UEs is much greater than the number of UEs that are determining their position. The process reduces overhead, thereby saving resources dedicated to post-PRS per ITS specifications, while optimizing positioning accuracy. Further, by reducing post-PRS messages, interference in the ITS messaging is reduced which will likely reduce interference in regular V2X messages. Further, the process is expandable to multi-user scenarios.

Figure 8:
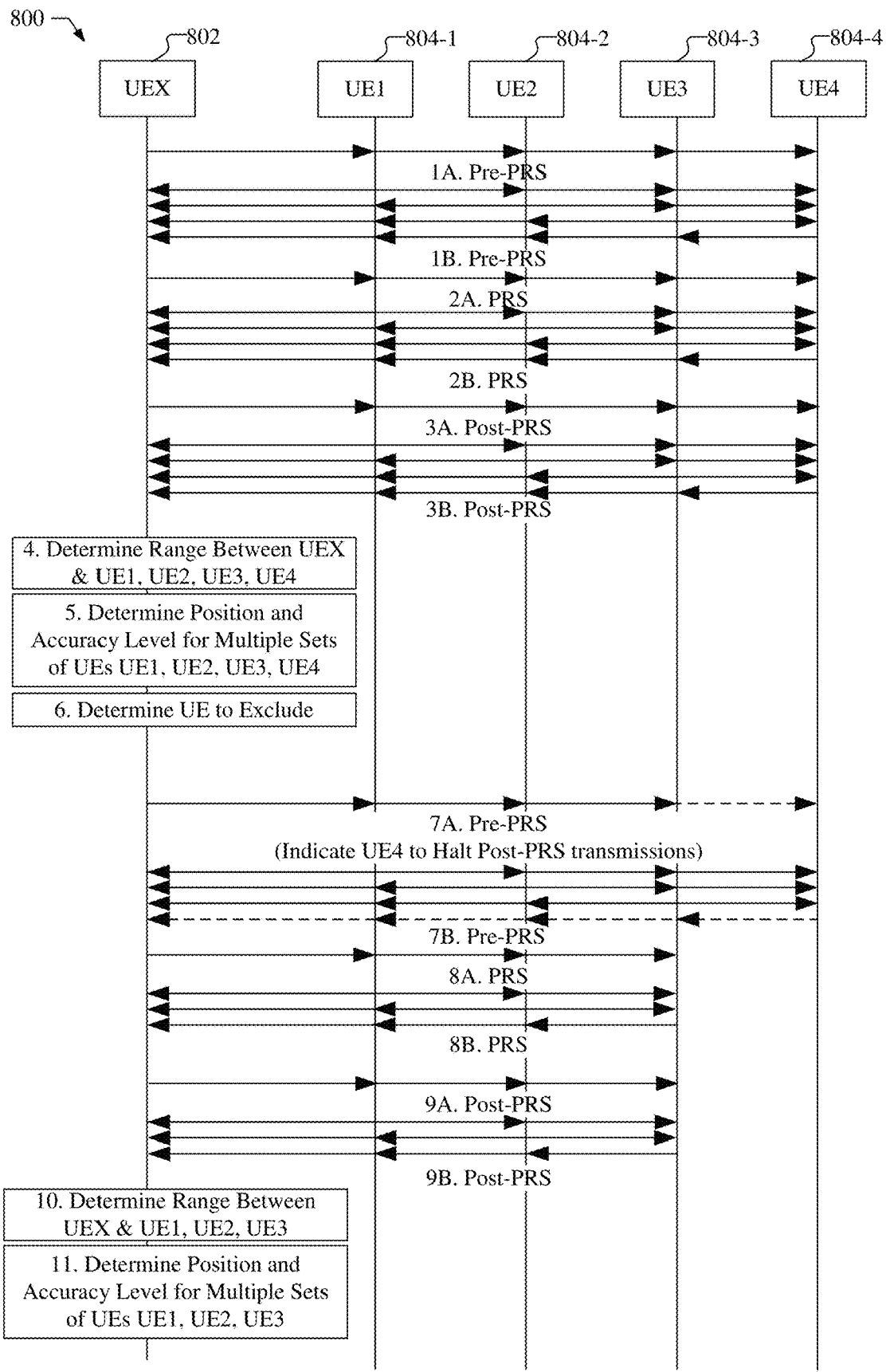
FIG. 8 illustrates an example of a signaling 800 for positioning sessions in which one or more responder UEs that provide information that does not significantly contribute to the final position estimate for the initiator UE are identified and excluded from subsequent positioning sessions.

FIG. 8 illustrates an example of a signaling flow 800 for positioning sessions in which one or more responder UEs that provide information that does not significantly contribute to the final position estimate for the initiator UE are identified and excluded from subsequent positioning sessions. The positioning sessions illustrated in FIG. 8 are initiated by UEX 802, which may be, e.g., vehicle based UEs (V-UE) 102 and 104, RSU 110 or UE 112, as described in FIG. 1. The positioning session further includes responder UEs, including UE1 804-1, UE2 804-2, UE3 804-3, and UE4 804-4 (sometimes collectively referred to as responder UEs 804), which may likewise be vehicle based UEs (V-UE) 102 and 104, RSU 110 or UE 112, as described in FIG. 1. The position of the initiator UEX 802 may be unknown, while one or more of the responder UEs may have known positions and may serve as anchor UEs for position determination of the initiator UE 802. It should be understood that FIG. 8 illustrates the signaling for two positioning sessions (or equivalently two PRS cycles) but that additional positioning sessions may be performed. Moreover, additional (or fewer) responder UEs may be present, which would involve additional (or fewer) communications that are similar to that shown in FIG. 8. As illustrated, the communications between the UEs 802 and 804 in FIG. 8 may be direct communications between the entities and may not involve infrastructure devices, such as base stations, to forward the messages between the entities.

At stage 1A, the initiator UEX 802 broadcasts an initial pre-ranging message (pre-PRS message) to request a positioning session with responder UEs 804. The pre-PRS message may be transmitted on a licensed spectrum. The pre-PRS message may include identifiers of responder UEs included in the ranging session (e.g., obtained from preceding capabilities messages (not shown)), as well as signal information to be used in the ranging session by the initiator UEX 802 and in some implementations by the responder UEs 804, such as PRS resources, including PRS bandwidth or channel and timing instances, and PRS identifier (ID).

At stage 1B, the responder UEs 804 broadcast pre-ranging messages (pre-PRS messages) in response to the initial pre-ranging message. The responding pre-PRS messages, for example, may acknowledge the initiating pre-PRS message from stage 1A and may provide signaling information, such as the PRS bandwidth or channel that will be used by each responder UEs 804. The pre-PRS messages may additionally indicate whether the responder UE is requesting its position or if it knows its position and may serve as an anchor UE. In some implementations, each UE may provide an indication of whether it needs to determine its position or if it knows its position and may serve as an anchor UE in the capabilities message. The pre-PRS messages of stage 1B may be transmitted on a licensed spectrum.

At stages 2A and 2B, the ranging signals (PRS signals) are broadcast by the initiating UEX 802 and responder UEs 804. The PRS signal may be broadcast on an unlicensed spectrum in order to use a wide frequency band. The first PRS signal in stage 2A may be broadcast by the initiator UEX 802 and the following PRS signals in stage 2B may be broadcast by the responder UEs 804 may be broadcast, e.g., based on LBT constraints if the PRS signals are broadcast on an unlicensed spectrum. Each broadcasting UE records the ToD of the broadcast PRS signal and in some implementations the AoD of the PRS signal and each receiving UE records the ToA of each received PRS signal and in some implementations the AoA of each received PRS signal.

At stages 3A and 3B, post-PRS messages are broadcast by the initiating UEX 802 and responder UEs 804, respectively. The post-PRS messages, for example, may be transmitted on a licensed spectrum. The post-PRS messages from each UE indicates the ToD, and in some implementations the AoD, of the PRS signal broadcast by the UE and further indicates the ToA, and in some implementations the AoA, of each PRS signal received by the UE. The post-PRS messages may further include, if known, the location of the UE, the orientation of UE, a broadcast indicator of the UE PRS, a reception indicator of PRS of the other UEs, as well as other related measurements, e.g., including map information, the locations of reflectors with respect to the UE, etc.

At stage 4, the initiator UEX 802 may determine the range between itself and each responder UEs 804 based on the ToD and ToA of the PRS signals broadcast in stages 2A and 2B as measured by the initiator UEX 802 and received in the post-PRS measurements in stage 3B. For example, the range may be determined based on the $ToD_i$ and $ToA_i$ for the PRSi signals (where i=1 for PRS broadcast by the initiator UEX 802 and i=2 for PRS broadcast by a responder UE 804) as:

$$\text{Range} = \frac{(ToD_1 - ToA_2) - (ToA_1 - ToD_2)}{2c}. \qquad \text{eq. 1}$$

At stage 5, the initiator UEX 802 may determine its estimated position and associated accuracy level using the determined ranges and the location information received from anchor UEs in the post-PRS messages in stage 3B as inputs to an EKF for the full set of responder UEs 804 and for proper subsets of responder UEs 804, e.g., as discussed in the process 600 shown in FIG. 6. Estimated position may be further based on additional information, such as AoA or AoD of the PRS signals, or geographic information, such as street locations, the position of the initiator UEX 802 may be determined using, e.g., multilateration and constraints pursuant to the AoA or AoD of the PRS signals and geographic information. As discussed in process 600 in FIG. 6, the initiator UEX 802 may determine the best subset of UEs using a predetermined threshold with a comparison of the accuracy level associated with each subset of UEs to the accuracy level associated with the full set of UEs.

At stage 6, the initiator UEX 802 may select one or more responder UEs 804 to exclude from subsequent positioning sessions. For example, the selected responder UEs may be determined based on the responder UEs that are not included in the best subset of UEs. For purposes of example, initiator UEX 802 may select responder UE4 804-4 to be excluded from subsequent positioning sessions.

At stage 7A, the initiator UEX 802 may initiate the subsequent positioning session by broadcasting an initial pre-ranging message (pre-PRS message) to request a positioning session with responder UEs 804. The pre-PRS message in stage 7A may be similar to the pre-PRS message in stage 1A but may not include an identifier for responder UE4 804-4 in order to exclude responder UE4 804-4 from the positioning session. Alternatively, the pre-PRS message may include an identifier for responder UE4 804-4 but may also include an indication that the responder UE4 804-4 will not transmit a post-PRS message, and optionally will not transmit a PRS signal or pre-PRS message in the positioning session. The indication to not transmit post-PRS message, for example, may be a flag associated with the identifier for the responder UE4 804-4 that is set. In some implementations, the indication to not transmit a post-PRS message may be sent directly to responder UE4 804-4 in a separate V2X message instead of the pre-PRS message.

At stage 7B, the responder UEs 804 broadcast pre-ranging messages (pre-PRS messages) in response to the initial pre-ranging message similar to the pre-ranging messages in stage 1B. As indicated by the dotted line, the responder UE4 804-4 may not broadcast the pre-ranging message if responder UE4 804-4 was not included in the pre-PRS message from stage 7A or if the indication to not transmit post-PRS message, also indicated to not transmit pre-PRS message.

At stages 8A and 8B, the ranging signals (PRS signals) are broadcast by the initiating UE1 402 and responder UEs 804, similar to stages 2A and 2B, except that responder UE4 804-4 may not broadcast a ranging signal, if responder UE4 804-4 was not included in the pre-PRS message from stage 7A or if the indication to not transmit post-PRS message, also indicated to not transmit the PRS signal.

At stages 9A and 9B, post-PRS messages are broadcast by the initiating UEX 802 and responder UEs 804, similar to stages 3A and 3B, except that responder UE4 804-4 does not broadcast a post-PRS message.

At stage 10, the initiator UEX 802 may determine the range between itself and each responder UEs 804, similar to stage 4 but excluding the range to responder UE4 804-4.

At stage 11, the initiator UEX 802 may determine its estimated position and associated accuracy level similar to the discussion in stage 5 but using the full set and proper subset of responder UEs (UE1 804-1, UE2 804-2, UE3 804-3), and not including responder UE4 804-4, e.g., as discussed in the process 600 shown in FIG. 6. The initiator UEX 802 may thus continue to identify and remove responder UEs that do not provide information in the post-PRS messages that significantly contributes to the final position estimate for the initiator UEX 802. If the responder UE4 804-4 is still visible to UEX 802, after a predetermined time, which may vary based on the speed of the UEX 802, or after UEX 802 has moved by more than a predetermined distance, the UEX 802 may again include responder UE4 804-4 in positioning sessions or indicate that the responder UE4 804-4 will transmit a post-PRS message (e.g., by removing the flag associated with the identifier for the responder UE4 804-4).

Additionally, if a responder UE, e.g., UE1 804-1, needs to determine its position, at stages 4, 5, and 6, the initiator UEX 802 may additionally perform the threshold test for the responder UE1 804-1, based on the information received in the post-PRS messages received at stage 3B, to determine if responder UE4 804-4 provides information that significantly contributes to the final position estimate for the responder UE1 804-1. The initiator UEX 802 may exclude the responder UE4 804-4 in stage 7A only if responder UE4 804-4 does not contributes to the final position estimate for both initiator UEX 802 and responder UE1 804-1. Alternatively, the responder UE1 804-1 may perform stages 4, 5, and 6 for itself, and if responder UE1 804-1 determines that the information provided by responder UE4 804-4 does not significantly contribute to its final position estimate, the responder UE1 804-1 may provide an indication to the responder UE4 804-4 to not transmit a post-PRS message. In some implementations, the indication from responder UE1 804-1 may be included in the pre-PRS message in stage 7B or may be sent directly to responder UE4 804-4 in a separate V2X message instead of the pre-PRS message. The responder UE4 804-4 may continue participating in the positioning session, including broadcasting a post-PRS message in stage 9B, unless it receives an indication to not transmit post-PRS from both the initiator UEX 802 and the responder UE1 802-1 (and all other position requesting UEs participating in the positioning session).

Figure 9:
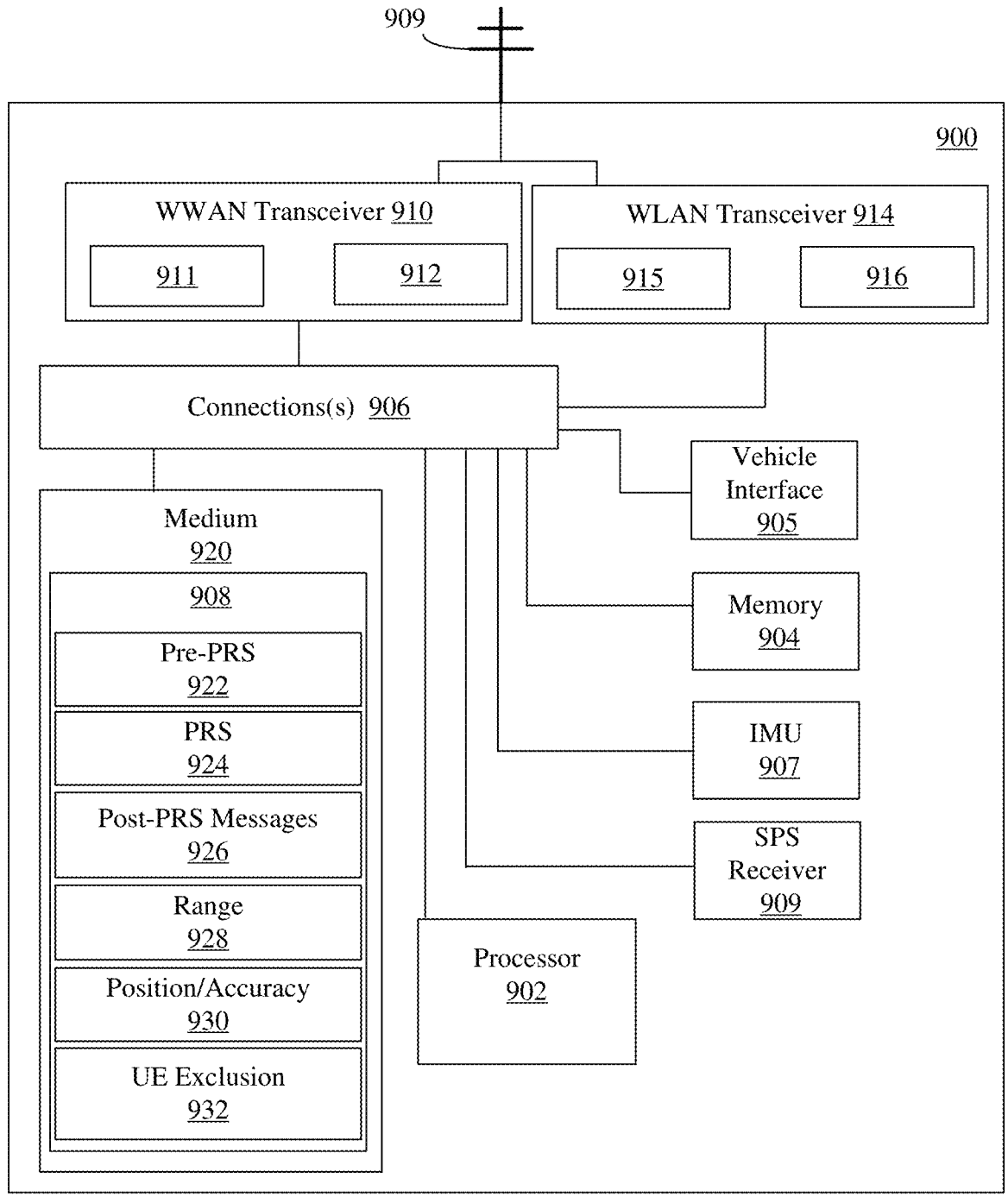
FIG. 9 shows a schematic block diagram illustrating certain exemplary features of a UE configured to act as an initiator UE or a responder UE during positioning sessions in which one or more anchor UEs do not significantly contribute to the final position estimates and may be excluded from subsequent positioning sessions.

FIG. 9 shows a schematic block diagram illustrating certain exemplary features of a user equipment (UE) 900, which may be UE in vehicles 102 or 104, an RSU 110, or UE 112 held by a pedestrian 114, as illustrated in FIG. 1, or any UE illustrated in FIG. 3 or 8. The UE 900 may be configured to act as an initiator UE or a responder UE during positioning sessions in which one or more responder UEs that do not significantly contribute to the final position estimates are identified and excluded from subsequent positioning sessions to reduce signaling overhead and improve efficiency, as discussed herein. If the UE 900 is a V-UE, it may be configured to control the automated driving of a vehicle, e.g., vehicle 102. For example, the UE 900 may include a vehicle interface 905 with which commands are provided to the vehicle for automated driving and sensory input, including speed and acceleration, may be provided from the vehicle to UE 900. The UE 900 may, for example, include one or more processors 902, memory 904, an inertial measurement unit (IMU) 907 that may include, e.g., an accelerometer, gyroscope, magnetometers, etc., which may be used to detect orientation with respect to a global or local reference frame and the motion or one or more motion characteristics of the vehicle, a satellite positioning system (SPS) receiver 909 to determine, e.g., a GPS position, and an external interface including, e.g., a Wireless Wide Area Network (WWAN) transceiver 910, and a Wireless Local Area Network (WLAN) transceiver 914, which may be operatively coupled with one or more connections 906 (e.g., buses, lines, fibers, links, etc.) to non-transitory computer readable medium 920 and memory 904. The UE 900 may further include additional items, which are not shown, such as a user interface that may include e.g., a display, a keypad or other input device, such as virtual keypad on the display, through which a user may interface with the user device. In certain example implementations, all or part of UE 900 may take the form of a chipset, and/or the like.

Transceiver 910 may be, e.g., a cellular transceiver, that is configured to transmit and receive direct communications in the wireless network, as illustrated in FIG. 1. The transceiver 910 may include a transmitter 911 enabled to transmit one or more signals over one or more types of wireless communication networks and a receiver 912 to receive one or more signals transmitted over the one or more types of wireless communication networks. Transceiver 914 may be, e.g., a short-range transceiver, and may be configured to transmit and receive direct communications in the wireless network, as illustrated in FIG. 1. The transceiver 914 may include a transmitter 915 enabled to transmit one or more signals, including ranging signals (PRS signals) and pre-ranging (pre-PRS) and post-ranging (post-PRS) messages, and combine and separate messages, over one or more types of wireless communication networks and a receiver 916 to receive one or more signals, e.g., including PRS and pre-PRS and post-PRS messages, combine and separate messages, transmitted over the one or more types of wireless communication networks. The transceivers 910 and 914 enable the UE 900 to communicate with transportation entities using D2D communication links, such as DSRC, C-V2X, or 5G NR.

In some embodiments, UE 900 may include antenna 909, which may be internal or external. The antenna 909 may be used to transmit and/or receive signals processed by transceiver 910 and/or transceiver 914. In some embodiments, antenna 909 may be coupled to transceiver 910 and/or transceiver 914. In some embodiments, measurements of signals received (transmitted) by UE 900 may be performed at the point of connection of the antenna 909 and transceiver 910 and/or transceiver 914. For example, the measurement point of reference for received (transmitted) RF signal measurements may be an input (output) terminal of the receivers 912, 916 (transmitters 911, 915) and an output (input) terminal of the antenna 909. In a UE 900 with multiple antennas 909 or antenna arrays, the antenna connector may be viewed as a virtual point representing the aggregate output (input) of multiple antennas. The phase difference of received signals at multiple antennas or antenna array may be used to determine the AoA of the signal with respect to the antenna array, which may be converted to a local or global reference frame based on a known orientation of the UE 900, e.g., based on the orientation of the UE 900 to the global or local reference frame as measured by the IMU 907.

The one or more processors 902 may be implemented using a combination of hardware, firmware, and software. For example, the one or more processors 902 may be configured to perform the functions discussed herein by implementing one or more instructions or program code 908 on a non-transitory computer readable medium, such as medium 920 and/or memory 904. In some embodiments, the one or more processors 902 may represent one or more circuits configurable to perform at least a portion of a data signal computing procedure or process related to the operation of UE 900.

The medium 920 and/or memory 904 may store instructions or program code 908 that contain executable code or software instructions that when executed by the one or more processors 902 cause the one or more processors 902 to operate as a special purpose computer programmed to perform the techniques disclosed herein. As illustrated in UE 900, the medium 920 and/or memory 904 may include one or more components or modules that may be implemented by the one or more processors 902 to perform the methodologies described herein. While the components or modules are illustrated as software in medium 920 that is executable by the one or more processors 902, it should be understood that the components or modules may be stored in memory 904 or may be dedicated hardware either in the one or more processors 902 or off the processors.

A number of software modules and data tables may reside in the medium 920 and/or memory 904 and be utilized by the one or more processors 902 in order to manage both communications and the functionality described herein. It should be appreciated that the organization of the contents of the medium 920 and/or memory 904 as shown in UE 900 is merely exemplary, and as such the functionality of the modules and/or data structures may be combined, separated, and/or be structured in different ways depending upon the implementation of the UE 900.

The medium 920 and/or memory 904 may include a pre-PRS module 922 that when implemented by the one or more processors 902 configures the one or more processors 902 to generate and transmit or receive pre-ranging messages, such as pre-PRS messages, via the transceiver 914, e.g., to initiate a ranging session or to accept a ranging session. The pre-PRS messages may be broadcast, multicast, or unicast (with RRC connection). In some implementations, the PRS messages may be transmitted and received over a licensed spectrum. The pre-PRS message may be an initiating pre-PRS message to initiate a ranging session or a responding pre-PRS message to acknowledge an initiating pre-PRS message. The pre-PRS messages may include identifiers for the initiating UE and one or more responder UEs for the positioning session. The participating UEs may be determined, e.g., from capabilities messages received by the UE 900, and some UEs may be excluded from a positioning session by not including the UE in the pre-PRS message or by including an indication in the pre-PRS message that the UE will not transmit the post-PRS message, and optionally other signals/messages, such as the PRS signal. The indication, for example, may be a flag associated with the excluded UE that is set in the pre-PRS message. The pre-PRS messages may further include ranging signal properties to be used in a ranging session. For example, the pre-PRS message may include an identifier for the ranging signal and timing information (e.g., time slot number) of the ranging signal and frequency that will be used to broadcast the ranging signal. The frequency, for example, may be selected from an available set of bandwidths, and may be selected by sensing interference and choosing a channel with an average interference RSRP that is less than a threshold. In some implementations, an initiating pre-PRS message may include an indication of the number of PRS cycles requested and the current PRS cycle.

The medium 920 and/or memory 904 may include a PRS module 924 that when implemented by the one or more processors 902 configures the one or more processors 902 to broadcast and receive a ranging signal to and from other UEs in the ranging session, via the transceiver 914, as discussed herein. The ranging signal, for example, may be a PRS signal as discussed herein. The ranging signal may be broadcast at the determined time and with the identifier and at the frequencies indicated over the pre-PRS message. The ranging signal may be broadcast and received over unlicensed spectrum and may be broadcast pursuant to category 2 or category 4 LBT constraints. The one or more processors 902, for example, may be configured to measure the ToD of broadcast ranging signals and the ToA of received ranging signals, and may be configured to measure the AoD of broadcast ranging signals and the AoA of received ranging signals.

The medium 920 and/or memory 904 may include a post-PRS module 926 that when implemented by the one or more processors 902 configures the one or more processors 902 to send and receive post-ranging messages to and from other UEs in the ranging session, via the transceiver 914, as discussed herein. The post-PRS messages that may include, e.g., an indication of the ToD, and in some implementations the AoD, of the broadcast ranging signals and an indication of the ToA, and in some implementations the AoA, of the received ranging signals. In some implementation, the indication of the ToD and ToA may be a difference between the ToD and ToA. In some implementations, the post-PRS messages may include an indication of the position of the UE, e.g., if the UE is an anchor UE used for positioning another UE.

The medium 920 and/or memory 904 may include a range module 928 that when implemented by the one or more processors 902 configures the one or more processors 902 to determine a range to other UEs based on the ToD and ToA of broadcast and received ranging signals as measured by the UE 900 and received in the post-PRS messages from other UEs.

The medium 920 and/or memory 904 may include a position/accuracy module 930 that when implemented by the one or more processors 902 configures the one or more processors 902 to determine a position and associated accuracy level for the UE 900, e.g., based on one or more ranges to broadcasting UEs and their location information using multilateration or other appropriate techniques discussed herein. For example, the one or more processors 902 may implement a Kalman filter or Extended Kalman filter to determine the position and associated accuracy level of the UE 900. The accuracy level, for example, may be an uncertainty or an estimated covariance. The one or more processors 902 may be configured to determined estimated positions and associated accuracy levels for different subsets of anchor UEs, e.g., including the full set of anchor UEs and different proper subsets of anchor UEs.

The medium 920 and/or memory 904 may include a UE exclusion module 932 that when implemented by the one or more processors 902 configures the one or more processors 902 to determine at least one anchor UE to be excluded from subsequent positioning sessions based on the accuracy levels determined based on the information received from the different subsets of anchor UEs. The one or more processors 902, for example, may compare the accuracy levels produced using proper subsets of anchor UEs to the accuracy level produces using the full set of anchor UEs. The one or more processors 902 may use a predetermined threshold to determine the best proper subset of anchor UEs, e.g., if the comparison of accuracy levels for the full set of anchor UEs and each proper subset of anchor UEs is above or equal to the predetermined threshold. The one or more processors 902 may determine the best proper subset of anchor UEs as the proper subset of anchor UEs with an accuracy level that is closest to the accuracy level produced using the full set of anchor UEs. The one or more UEs to be excluded from subsequent positioning sessions may be selected as the anchor UEs from the full set of anchor UEs that are not included in the best proper subset of anchor UEs. The one or more processors 902 may be configured to not include the selected UE in the pre-PRS message for subsequent positioning sessions or to send to the selected UE, e.g., via transceiver 914, an indication that the selected UE will not transmit the post-PRS message, and optionally other signals/messages, such as the PRS signal. The indication, for example, may be a flag associated with the excluded UE that is set in the pre-PRS message or may be sent in a separate message. The one or more processors 902 may be configured to receive an indication, e.g., via the transceiver 914, that the UE has been selected to not transmit the post-PRS message, and optionally other signals/messages, such as the PRS signal in a positioning session and to halt transmissions of the post-PRS message and optionally the other messages. The one or more processors 902 may be configured to halt transmissions of the post-PRS message and optionally the other messages only if all UEs that require positioning in a positioning session send an indication to that the UE has been selected to not transmit the post-PRS message, and optionally other signals/messages.

The methodologies described herein may be implemented by various means depending upon the application. For example, these methodologies may be implemented in hardware, firmware, software, or any combination thereof. For a hardware implementation, the one or more processors 902 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 920 or memory 904 that is connected to and executed by the one or more processors 902. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 908 on a non-transitory computer readable medium, such as medium 920 and/or memory 904. Examples include computer readable media encoded with a data structure and computer readable media encoded with a computer program 908. For example, the non-transitory computer readable medium including program code 908 stored thereon may include program code 908 to support determination of responder UEs that provide information that does not significantly contribute to the final position estimate for the initiator UE and to exclude the UEs from subsequent positioning sessions to reduce signaling overhead and improve efficiency, in a manner consistent with disclosed embodiments. Non-transitory computer readable medium 920 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 908 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 920, instructions and/or data may be provided as signals on transmission media included in a communication apparatus. For example, a communication apparatus may include a transceiver 910 having signals indicative of instructions and data. The instructions and data are configured to cause one or more processors to implement the functions outlined in the claims. That is, the communication apparatus includes transmission media with signals indicative of information to perform disclosed functions.

Memory 904 may represent any data storage mechanism. Memory 904 may include, for example, a primary memory and/or a secondary memory. Primary memory may include, for example, a random-access memory, read only memory, etc. While illustrated in this example as being separate from one or more processors 902, it should be understood that all or part of a primary memory may be provided within or otherwise co-located/coupled with the one or more processors 902. Secondary memory may include, for example, the same or similar type of memory as primary memory and/or one or more data storage devices or systems, such as, for example, a disk drive, an optical disc drive, a tape drive, a solid-state memory drive, etc.

In certain implementations, secondary memory may be operatively receptive of, or otherwise configurable to couple to a non-transitory computer readable medium 920. As such, in certain example implementations, the methods and/or apparatuses presented herein may take the form in whole or part of a computer readable medium 920 that may include computer implementable code 908 stored thereon, which if executed by one or more processors 902 may be operatively enabled to perform all or portions of the example operations as described herein. Computer readable medium 920 may be a part of memory 904.

Figure 10:
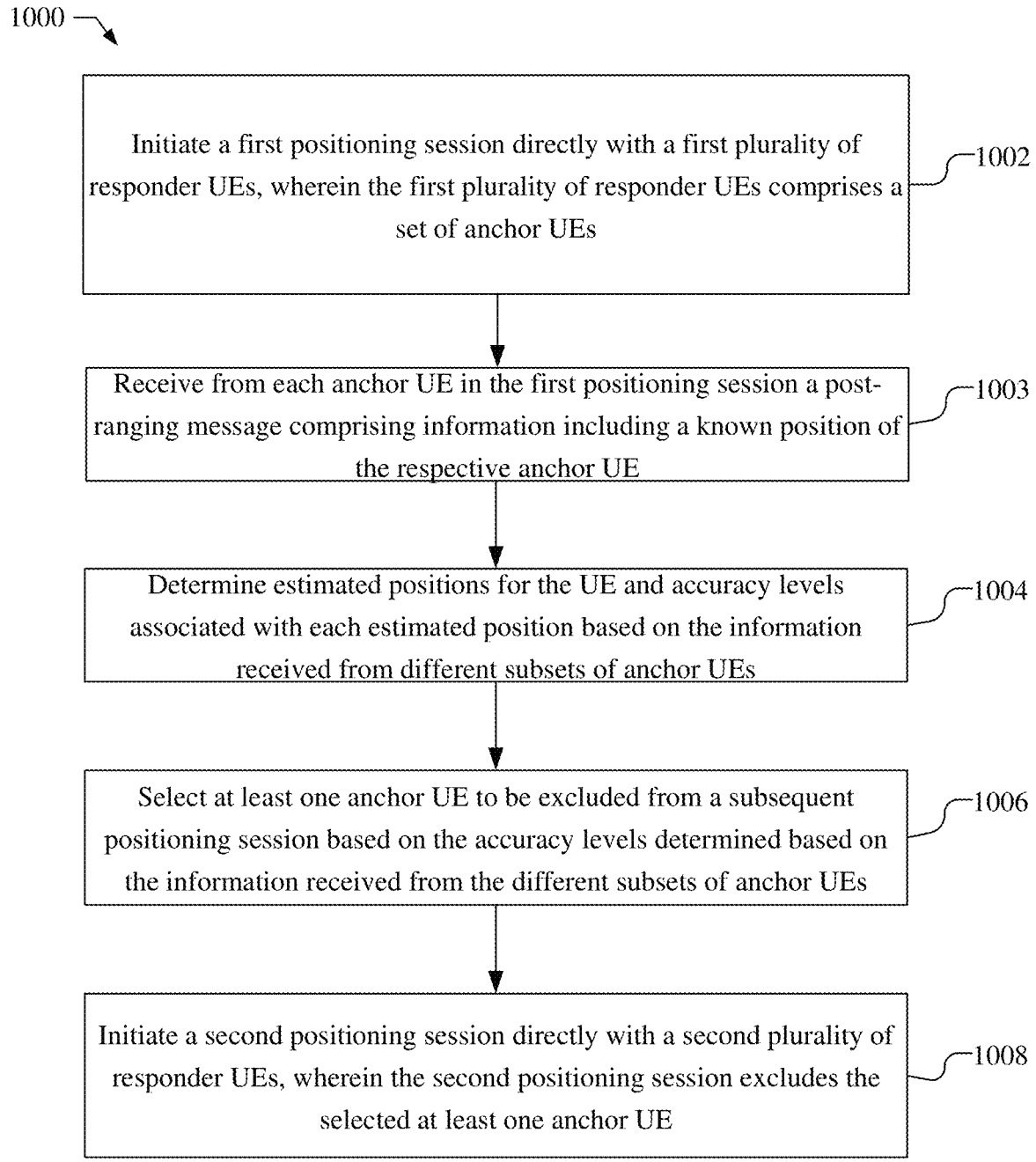
FIG. 10 is a flow chart illustrating a method of positioning based on ranging in a distributed system of user equipment.

FIG. 10 is a flow chart 1000 positioning based on ranging performed by a UE in a distributed system of user equipments (UEs), such as an initiator UEX 302, UEX 802, or UE 900.

At block 1002, the UE initiates a first positioning session directly with a first plurality of responder UEs, wherein the first plurality of responder UEs comprises a set of anchor UEs, e.g., as discussed at FIG. 6 and stage 1A of FIG. 8. A means for initiating a first positioning session directly with a first plurality of responder UEs, wherein the first plurality of responder UEs comprises a set of anchor UEs may be, e.g., the transceiver 914 and the one or more processors 902 with dedicated hardware or implementing executable code or software instructions in memory 904 and/or medium 920, such as the pre-PRS module 922.

At block 1003, the UE receives from each anchor UE in the first positioning session a post-ranging message comprising information including a known position of the respective anchor UE, e.g., as discussed at FIG. 6 and stage 3B of FIG. 8. A means for receiving from each anchor UE in the first positioning session a post-ranging message comprising information including a known position of the respective anchor UE may be, e.g., the transceiver 914 and the one or more processors 902 with dedicated hardware or implementing executable code or software instructions in memory 904 and/or medium 920, such as the post-PRS module 926.

At block 1004, the UE determines estimated positions for the UE and accuracy levels associated with each estimated position based on the information received from different subsets of anchor UEs, e.g., as discussed at FIG. 6 and stages 4 and 5 of FIG. 8. In one implementation, the accuracy levels associated with each estimated position comprise one or more of an accuracy level or an estimation covariance, e.g., as discussed in FIG. 6 and stage 5 of FIG. 8. A means for determining estimated positions for the UE and accuracy levels associated with each estimated position based on the information received from different subsets of anchor UEs may be, e.g., the one or more processors 902 with dedicated hardware or implementing executable code or software instructions in memory 904 and/or medium 920, such as the range module 928 and the position/accuracy module 930.

At block 1006, the UE selects at least one anchor UE to be excluded from a subsequent positioning session based on the accuracy levels determined based on the information received from the different subsets of anchor UEs, e.g., as discussed at FIG. 6 and stage 6 of FIG. 8. A means for selecting at least one anchor UE to be excluded from a subsequent positioning session based on the accuracy levels determined based on the information received from the different subsets of anchor UEs may be, e.g., the one or more processors 902 with dedicated hardware or implementing executable code or software instructions in memory 904 and/or medium 920, such as the UE exclusion module 932.

At block 1008, the UE initiates a second positioning session directly with a second plurality of responder UEs, wherein the selected at least one anchor UE is excluded from the second positioning session, e.g., as discussed at FIG. 6 and stage 7A of FIG. 8. A means for initiating a second positioning session directly with a second plurality of responder UEs, wherein the selected at least one anchor UE is excluded from the second positioning session may be, e.g., the transceiver 914 and the one or more processors 902 with dedicated hardware or implementing executable code or software instructions in memory 904 and/or medium 920, such as the pre-PRS module 922 and UE exclusion module 932.

In one implementation, the UE may determine the estimated positions for the UE and the accuracy levels associated with each estimated position based on the information received from the different subsets of anchor by determining an estimated position for the UE and an accuracy level associated with the estimated position based on information received from each anchor UE in the set of anchor UEs, e.g., as discussed at FIG. 6 and stage 5 of FIG. 8; and determining a plurality of estimated positions for the UE and accuracy levels associated with the plurality of estimated positions based on information received from anchor UEs in different subsets of anchor UEs, wherein each subset of anchor UEs has fewer anchor UEs than the set of anchor UEs, e.g., as discussed at FIG. 6 and stage 5 of FIG. 8. A means for determining an estimated position for the UE and an accuracy level associated with the estimated position based on information received from each anchor UE in the set of anchor UEs may be, e.g., the one or more processors 902 with dedicated hardware or implementing executable code or software instructions in memory 904 and/or medium 920, such as the position/accuracy module 930. A means for determining a plurality of estimated positions for the UE and accuracy levels associated with the plurality of estimated positions based on information received from anchor UEs in different subsets of anchor UEs, wherein each subset of anchor UEs has fewer anchor UEs than the set of anchor UEs may be, e.g., the one or more processors 902 with dedicated hardware or implementing executable code or software instructions in memory 904 and/or medium 920, such as the position/accuracy module 930.

In one implementation, the UE may determine the estimated positions for the UE and the accuracy levels associated with each estimated position based on the information received from different subsets of anchor UE by determining a range to each anchor UE, e.g., as discussed at FIG. 6 and stage 4 of FIG. 8; and determining the estimated position for the UE, for each subset of anchor UEs, based on the range to each anchor UE in a subset of anchor UEs and the known position of each anchor UE in the subset of anchor UEs, e.g., as discussed at FIG. 6 and stage 5 of FIG. 8. A means for determining a range to each anchor UE may be, e.g., the one or more processors 902 with dedicated hardware or implementing executable code or software instructions in memory 904 and/or medium 920, such as the range module 928. A means for determining the estimated position for the UE, for each subset of anchor UEs, based on the range to each anchor UE in a subset of anchor UEs and the known position of each anchor UE in the subset of anchor UEs may be, e.g., the one or more processors 902 with dedicated hardware or implementing executable code or software instructions in memory 904 and/or medium 920, such as the position/accuracy module 930.

In one implementation, the UE may select at least one anchor UE to be excluded from the subsequent positioning session by generating comparisons of accuracy levels for the different subsets of anchor UEs by comparing an accuracy level determined based on information received from the set of anchor UEs to each accuracy level determined based on information received from anchor UEs in different subsets of anchor UEs, e.g., as discussed in stage 610 of FIG. 6 and stage 5 and 6 of FIG. 8; determining a subset of anchor of UEs with an associated comparison of accuracy levels that is greater than a predetermined threshold, e.g., as discussed in stage 612 of FIG. 6 and stage 5 and 6 of FIG. 8; and selecting the at least one anchor UE based on the set of anchor UEs and the determined subset of anchor UEs, e.g., as discussed in FIG. 6 and stage 6 of FIG. 8. A means for generating comparisons of accuracy levels for the different subsets of anchor UEs by comparing an accuracy level determined based on information received from the set of anchor UEs to each accuracy level determined based on information received from anchor UEs in different subsets of anchor UEs may be, e.g., the one or more processors 902 with dedicated hardware or implementing executable code or software instructions in memory 904 and/or medium 920, such as the UE exclusion module 932. A means for determining a subset of anchor of UEs with an associated comparison of accuracy levels that is greater than a predetermined threshold may be, e.g., the one or more processors 902 with dedicated hardware or implementing executable code or software instructions in memory 904 and/or medium 920, such as the UE exclusion module 932. A means for selecting the at least one anchor UE based on the set of anchor UEs and the determined subset of anchor UEs may be, e.g., the one or more processors 902 with dedicated hardware or implementing executable code or software instructions in memory 904 and/or medium 920, such as the UE exclusion module 932.

In one implementation, the UE may select at least one anchor UE to be excluded from the subsequent positioning session by comparing an accuracy level determined based on information received from the set of anchor UEs to each accuracy level determined based on information received from anchor UEs in different subsets of anchor UEs, e.g., as discussed in stage 610 of FIG. 6 and stage 5 and 6 of FIG. 8; determining a subset of anchor of UEs with an associated accuracy level that is closer to the accuracy level associated with the set of anchor UEs than any other subset of anchor UEs, e.g., as discussed in stage 612 of FIG. 6 and stage 5 and 6 of FIG. 8; and selecting the at least one anchor UE based on the set of anchor UEs and the determined subset of anchor UEs, e.g., as discussed in FIG. 6 and stage 6 of FIG. 8. A means for comparing an accuracy level determined based on information received from the set of anchor UEs to each accuracy level determined based on information received from anchor UEs in different subsets of anchor UEs may be, e.g., the one or more processors 902 with dedicated hardware or implementing executable code or software instructions in memory 904 and/or medium 920, such as the UE exclusion module 932. A means for determining a subset of anchor of UEs with an associated accuracy level that is closer to the accuracy level associated with the set of anchor UEs than any other subset of anchor UEs may be, e.g., the one or more processors 902 with dedicated hardware or implementing executable code or software instructions in memory 904 and/or medium 920, such as the UE exclusion module 932. A means for selecting the at least one anchor UE based on the set of anchor UEs and the determined subset of anchor UEs may be, e.g., the one or more processors 902 with dedicated hardware or implementing executable code or software instructions in memory 904 and/or medium 920, such as the UE exclusion module 932.

In one implementation, the UE may initiate the first positioning session directly with the first plurality of responder UEs by broadcasting a first initial pre-ranging message to initiate the first positioning session, the first initial pre-ranging message identifying each responder UE in the first plurality of responder UEs, e.g., as discussed at stage 1A of FIG. 8; and receiving a first response pre-ranging message from each responder UE in the first plurality of responder UEs, e.g., as discussed at stage 1B of FIG. 8. A means for initiating the first positioning session directly with the first plurality of responder UEs by broadcasting a first initial pre-ranging message to initiate the first positioning session, the first initial pre-ranging message identifying each responder UE in the first plurality of responder UEs may be, e.g., the transceiver 914 and the one or more processors 902 with dedicated hardware or implementing executable code or software instructions in memory 904 and/or medium 920, such as the pre-PRS module 922. A means for receiving a first response pre-ranging message from each responder UE in the first plurality of responder UEs may be, e.g., the transceiver 914 and the one or more processors 902 with dedicated hardware or implementing executable code or software instructions in memory 904 and/or medium 920, such as the pre-PRS module 922.

For example, the UE may initiate the second positioning session directly with the second plurality of responder UEs by broadcasting a second initial pre-ranging message to initiate the second positioning session, the second initial pre-ranging message identifying each responder UE in the second plurality of responder UEs, wherein the selected at least one anchor UE is not identified in the second initial pre-ranging message, e.g., as discussed at stage 7A of FIG. 8; and receiving a second response pre-ranging message from each responder UE in the second plurality of responder UEs, e.g., as discussed at stage 7B of FIG. 8. A means for broadcasting a second initial pre-ranging message to initiate the second positioning session, the second initial pre-ranging message identifying each responder UE in the second plurality of responder UEs, wherein the selected at least one anchor UE is not identified in the second initial pre-ranging message may be, e.g., the transceiver 914 and the one or more processors 902 with dedicated hardware or implementing executable code or software instructions in memory 904 and/or medium 920, such as the pre-PRS module 922. A means for receiving a second response pre-ranging message from each responder UE in the second plurality of responder UEs may be, e.g., the transceiver 914 and the one or more processors 902 with dedicated hardware or implementing executable code or software instructions in memory 904 and/or medium 920, such as the pre-PRS module 922.

For example, the UE may initiate the second positioning session directly with the second plurality of responder UEs by broadcasting a second initial pre-ranging message to initiate the second positioning session, the second initial pre-ranging message identifying each responder UE in the second plurality of responder UEs, wherein the selected at least one anchor UE is identified in the second initial pre-ranging message, e.g., as discussed at stage 7A of FIG. 8; and providing an indication to the selected at least one anchor UE that the selected at least one anchor UE will not transmit the post-ranging message during the second positioning session, e.g., as discussed at stage 7A of FIG. 8. For example, the indication provided to the selected at least one anchor UE that the selected at least one anchor UE will not transmit the post-ranging message during the second positioning session may be included in one of the second initial pre-ranging message or a separate message. A means for broadcasting a second initial pre-ranging message to initiate the second positioning session, the second initial pre-ranging message identifying each responder UE in the second plurality of responder UEs, wherein the selected at least one anchor UE is identified in the second initial pre-ranging message may be, e.g., the transceiver 914 and the one or more processors 902 with dedicated hardware or implementing executable code or software instructions in memory 904 and/or medium 920, such as the pre-PRS module 922. A means for providing an indication to the selected at least one anchor UE that the selected at least one anchor UE will not transmit the post-ranging message during the second positioning session may be, e.g., the transceiver 914 and the one or more processors 902 with dedicated hardware or implementing executable code or software instructions in memory 904 and/or medium 920, such as the pre-PRS module 922 or UE exclusion module 932.

Figure 11:
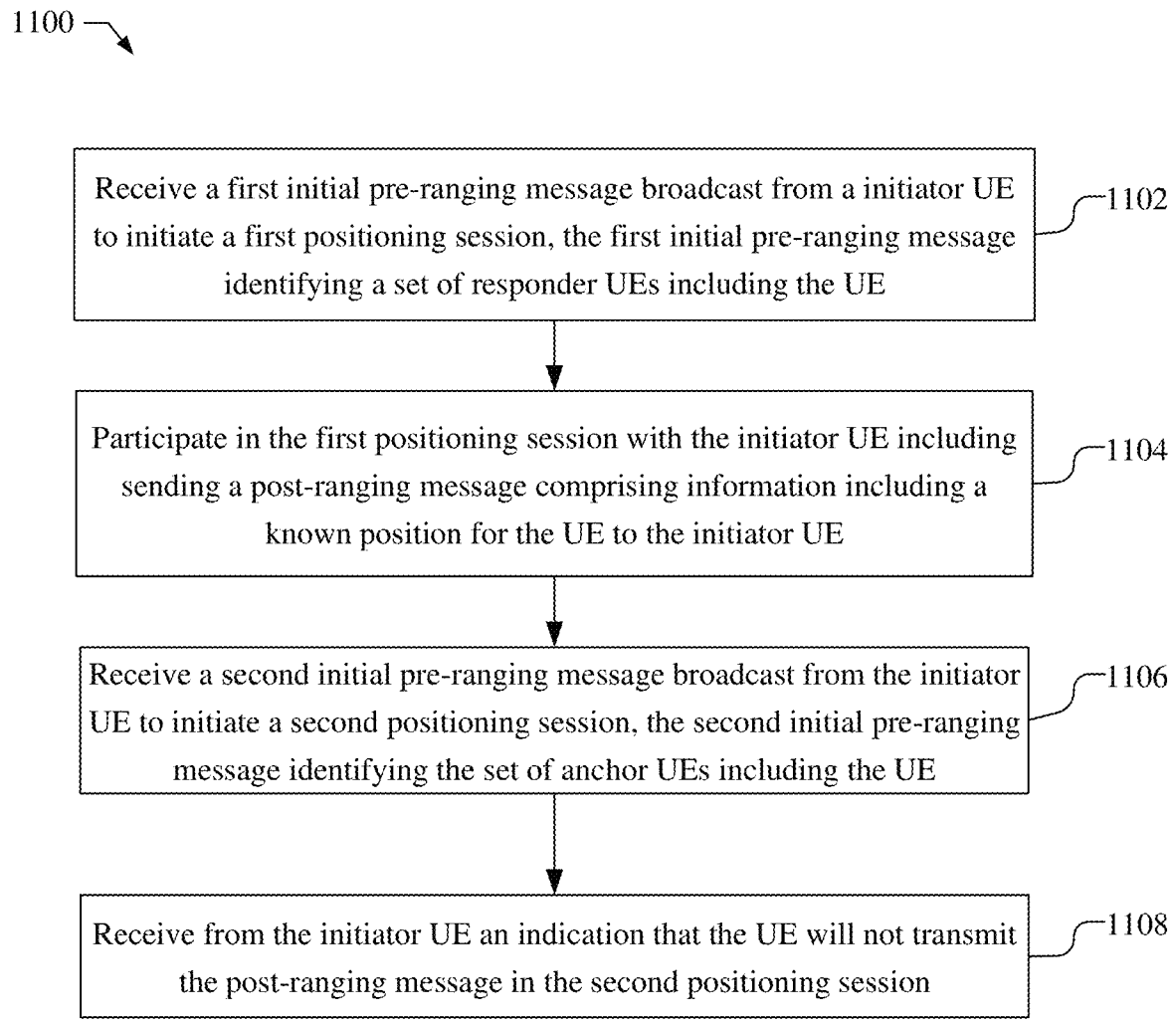
FIG. 11 is a flow chart illustrating a method of positioning based on ranging in a distributed system of user equipment.

FIG. 11 is a flow chart 1100 positioning based on ranging in a distributed system of user equipment (UE) performed by a UE, such as an anchor UE 304, UE 804, or UE 900.

At block 1202, the UE receives a first initial pre-ranging message broadcast from an initiator UE to initiate a first positioning session, the first initial pre-ranging message identifying a set of responder UEs including the UE, e.g., as discussed at FIG. 6 and stages 1A of FIG. 8. A means for receiving a first initial pre-ranging message broadcast from an initiator UE to initiate a first positioning session, the first initial pre-ranging message identifying a set of responder UEs including the UE may be, e.g., the transceiver 914 and the one or more processors 902 with dedicated hardware or implementing executable code or software instructions in memory 904 and/or medium 920, such as the pre-PRS module 922.

At block 1204, the UE may participate in the first positioning session with the initiator UE including sending a post-ranging message comprising information including a known position for the UE to the initiator UE, e.g., as discussed at FIG. 6 and stages 1B, 2A, 2B, 3A, and 3B of FIG. 8. A means for participating in the first positioning session with the initiator UE including sending a post-ranging message comprising information including a known position for the UE to the initiator UE may be, e.g., the transceiver 914 and the one or more processors 902 with dedicated hardware or implementing executable code or software instructions in memory 904 and/or medium 920, such as the pre-PRS module 922, PRS module 924, and post-PRS module 926.

At block 1206, the UE may receive a second initial pre-ranging message broadcast from the initiator UE to initiate a second positioning session, the second initial pre-ranging message identifying the set of anchor UEs including the UE, e.g., as discussed at FIG. 6 and stages 7A of FIG. 8. A means for receiving a second initial pre-ranging message broadcast from the initiator UE to initiate a second positioning session, the second initial pre-ranging message identifying the set of anchor UEs including the UE may be, e.g., the transceiver 914 and the one or more processors 902 with dedicated hardware or implementing executable code or software instructions in memory 904 and/or medium 920, such as the pre-PRS module 922.

At block 1208 the UE receives from the initiator UE an indication that the UE will not transmit the post-ranging message in the second positioning session, e.g., as discussed at FIG. 6 and stages 7A of FIG. 8. For example, the indication received from the initiator UE that the UE will not transmit the post-ranging message in the second positioning session is included in one of the second initial pre-ranging message or a separate message. A means for receiving from the initiator UE an indication that the UE will not transmit the post-ranging message in the second positioning session may be, e.g., the transceiver 914 and the one or more processors 902 with dedicated hardware or implementing executable code or software instructions in memory 904 and/or medium 920, such as the pre-PRS module 922 or the UE exclusion module 932.

In one implementation, the UE may participate in the first positioning session with the initiator UE by broadcasting a first response pre-ranging message to the initiator UE, e.g., as discussed at stage 1B of FIG. 8; receive a first ranging signal that is broadcast by the initiator UE, e.g., as discussed at stage 2A of FIG. 8; broadcast a second ranging signal that is received by the initiator UE, e.g., as discussed at stage 2B of FIG. 8; receive an initial post-ranging message broadcast by the initiator UE that comprises a first time of departure of the first ranging signal and a first time of arrival of the second ranging signal, e.g., as discussed at stage 3A of FIG. 8; and broadcast the post-ranging message that is received by the initiator UE that comprises the information including a second time of arrival of the first ranging signal and a second time of departure arrival of the second ranging signal, and the known position of the UE, e.g., as discussed at stage 3B of FIG. 8. A means for broadcasting a first response pre-ranging message to the initiator UE may be, e.g., the transceiver 914 and the one or more processors 902 with dedicated hardware or implementing executable code or software instructions in memory 904 and/or medium 920, such as the pre-PRS module 922. A means for receiving a first ranging signal that is broadcast by the initiator UE may be, e.g., the transceiver 914 and the one or more processors 902 with dedicated hardware or implementing executable code or software instructions in memory 904 and/or medium 920, such as the PRS module 924. A means for broadcasting a second ranging signal that is received by the initiator UE may be, e.g., the transceiver 914 and the one or more processors 902 with dedicated hardware or implementing executable code or software instructions in memory 904 and/or medium 920, such as the PRS module 924. A means for receiving an initial post-ranging message broadcast by the initiator UE that comprises a first time of departure of the first ranging signal and a first time of arrival of the second ranging signal may be, e.g., the transceiver 914 and the one or more processors 902 with dedicated hardware or implementing executable code or software instructions in memory 904 and/or medium 920, such as the post-PRS module 926. A means for broadcasting the post-ranging message that is received by the initiator UE that comprises the information including a second time of arrival of the first ranging signal and a second time of departure arrival of the second ranging signal, and the known position of the UE may be, e.g., the transceiver 914 and the one or more processors 902 with dedicated hardware or implementing executable code or software instructions in memory 904 and/or medium 920, such as the post-PRS module 926.

In some implementations, the UE may broadcast a second response pre-ranging message to the initiator UE in response to the second initial pre-ranging message broadcast from the initiator UE to initiate the second positioning session, wherein the UE does not broadcast a ranging signal in the second positioning session and does not broadcast the post-ranging message in the second positioning session, e.g., as discussed in stages 7B, 8B, and 9B of FIG. 8. A means for broadcasting a second response pre-ranging message to the initiator UE in response to the second initial pre-ranging message broadcast from the initiator UE to initiate the second positioning session, wherein the UE does not broadcast a ranging signal in the second positioning session and does not broadcast the post-ranging message in the second positioning session may be, e.g., the transceiver 914 and the one or more processors 902 with dedicated hardware or implementing executable code or software instructions in memory 904 and/or medium 920, such as the pre-PRS module 922 and UE exclusion module 932.

In some implementations, the UE may further receive from a second UE that requires positioning a second indication that the UE will not transmit the post-ranging message in the second positioning session wherein the UE does not transmit the post-ranging message in the second positioning session, e.g., as discussed in FIGS. 7 and 8. A means for receiving from a second UE that requires positioning a second indication that the UE will not transmit the post-ranging message in the second positioning session wherein the UE does not transmit the post-ranging message in the second positioning session may be, e.g., the transceiver 914 and the one or more processors 902 with dedicated hardware or implementing executable code or software instructions in memory 904 and/or medium 920, such as the pre-PRS module 922 or the UE exclusion module 932.

In some implementations, the UE may further receive from a second UE that requires positioning an indication that the UE will transmit the post-ranging message in the second positioning session, e.g., as discussed in FIGS. 7 and 8; and may participate in the second positioning session including sending a second post-ranging message comprising information including the known position for the UE to the initiator UE and the second UE, e.g., as discussed in FIGS. 7 and 8. A means for receiving from a second UE that requires positioning an indication that the UE will transmit the post-ranging message in the second positioning session may be, e.g., the transceiver 914 and the one or more processors 902 with dedicated hardware or implementing executable code or software instructions in memory 904 and/or medium 920, such as the pre-PRS module 922 or the UE exclusion module 932. A means for participating in the second positioning session including sending a second post-ranging message comprising information including the known position for the UE to the initiator UE and the second UE may be, e.g., the transceiver 914 and the one or more processors 902 with dedicated hardware or implementing executable code or software instructions in memory 904 and/or medium 920, such as the pre-PRS module 922, PRS module 924, and post-PRS module 926.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures, or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter.

Additionally, many modifications may be made to adapt a particular situation to the teachings of claimed subject matter without departing from the central concept described herein.

Implementation examples are described in the following numbered clauses:

1. A method of positioning based on ranging performed by a UE in a distributed system of user equipments (UEs), the method comprising:

initiating a first positioning session directly with a first plurality of responder UEs, wherein the first plurality of responder UEs comprises a set of anchor UEs;

receiving from each anchor UE in the first positioning session a post-ranging message comprising information including a known position of the respective anchor UE;

determining estimated positions for the UE and accuracy levels associated with each estimated position based on the information received from different subsets of anchor UEs;

selecting at least one anchor UE to be excluded from a subsequent positioning session based on the accuracy levels determined based on the information received from the different subsets of anchor UEs; and initiating a second positioning session directly with a second plurality of responder UEs, wherein the selected at least one anchor UE is excluded from the second positioning session.

2. The method of clause 1, wherein determining the estimated positions for the UE and the accuracy levels associated with each estimated position based on the information received from the different subsets of anchor comprises:

determining an estimated position for the UE and an accuracy level associated with the estimated position based on information received from each anchor UE in the set of anchor UEs; and determining a plurality of estimated positions for the UE and accuracy levels associated with the plurality of estimated positions based on information received from anchor UEs in different subsets of anchor UEs, wherein each subset of anchor UEs has fewer anchor UEs than the set of anchor UEs.

3. The method of either of clauses 1 or 2, wherein determining the estimated positions for the UE and the accuracy levels associated with each estimated position based on the information received from different subsets of anchor UE comprises:

determining a range to each anchor UE; and determining the estimated position for the UE, for each subset of anchor UEs, based on the range to each anchor UE in a subset of anchor UEs and the known position of each anchor UE in the subset of anchor UEs.

4. The method of any of clauses 1-3, wherein the accuracy levels associated with each estimated position comprise one or more of a confidence level or an estimation covariance.

5. The method of any of clauses 1-4, wherein selecting at least one anchor UE to be excluded from the subsequent positioning session comprises:

generating comparisons of accuracy levels for the different subsets of anchor UEs by comparing an accuracy level determined based on information received from the set of anchor UEs to each accuracy level determined based on information received from anchor UEs in different subsets of anchor UEs; and determining a subset of anchor of UEs with an associated comparison of accuracy levels that is greater than a predetermined threshold; and selecting the at least one anchor UE based on the set of anchor UEs and the determined subset of anchor UEs.

6. The method of any of clauses 1-5, wherein selecting at least one anchor UE to be excluded from the subsequent positioning session comprises:

comparing an accuracy level determined based on information received from the set of anchor UEs to each accuracy level determined based on information received from anchor UEs in different subsets of anchor UEs;

determining a subset of anchor of UEs with an associated accuracy level that is closer to the accuracy level associated with the set of anchor UEs than any other subset of anchor UEs; and selecting the at least one anchor UE based on the set of anchor UEs and the determined subset of anchor UEs.

7. The method of any of clauses 1-6, wherein initiating the first positioning session directly with the first plurality of responder UEs comprises:

broadcasting a first initial pre-ranging message to initiate the first positioning session, the first initial pre-ranging message identifying each responder UE in the first plurality of responder UEs; and receiving a first response pre-ranging message from each responder UE in the first plurality of responder UEs.

8. The method of clause 7, wherein initiating the second positioning session directly with the second plurality of responder UEs comprises:

broadcasting a second initial pre-ranging message to initiate the second positioning session, the second initial pre-ranging message identifying each responder UE in the second plurality of responder UEs, wherein the selected at least one anchor UE is not identified in the second initial pre-ranging message;

receiving a second response pre-ranging message from each responder UE in the second plurality of responder UEs.

9. The method of clause 7, wherein initiating the second positioning session directly with the second plurality of responder UEs comprises:

broadcasting a second initial pre-ranging message to initiate the second positioning session, the second initial pre-ranging message identifying each responder UE in the second plurality of responder UEs, wherein the selected at least one anchor UE is identified in the second initial pre-ranging message; and providing an indication to the selected at least one anchor UE that the selected at least one anchor UE will not transmit the post-ranging message during the second positioning session.

10. The method of clause 9, wherein the indication provided to the selected at least one anchor UE that the selected at least one anchor UE will not transmit the post-ranging message during the second positioning session is included in one of the second initial pre-ranging message or a separate message.

11. The method of clause 9, wherein the selected at least one anchor UE does not participate in the second positioning session when a second UE that requires positioning provides a second indication to the selected at least one anchor UE that the selected at least one anchor UE will not transmit the post-ranging message during the second positioning session.

12. A user equipment (UE) configured for positioning based on ranging in a distributed system of UEs, the UE comprising:

a wireless transceiver configured to wirelessly communicate with entities in a wireless network;

at least one memory; and at least one processor coupled to the wireless transceiver and the at least one memory, wherein the at least one processor is configured to:

initiate a first positioning session directly with a first plurality of responder UEs, wherein the first plurality of responder UEs comprises a set of anchor UEs;

receive from each anchor UE in the first positioning session a post-ranging message comprising information including a known position of the respective anchor UE;

determine estimated positions for the UE and accuracy levels associated with each estimated position based on the information received from different subsets of anchor UEs;

select at least one anchor UE to be excluded from a subsequent positioning session based on the accuracy levels determined based on the information received from the different subsets of anchor UEs; and initiate a second positioning session directly with a second plurality of responder UEs, wherein the selected at least one anchor UE is excluded from the second positioning session.

13. The UE of clause 12, wherein the at least one processor is configured to determine the estimated positions for the UE and the accuracy levels associated with each estimated position based on the information received from the different subsets of anchor by being configured to:

determine an estimated position for the UE and an accuracy level associated with the estimated position based on information received from each anchor UE in the set of anchor UEs; and determine a plurality of estimated positions for the UE and accuracy levels associated with the plurality of estimated positions based on information received from anchor UEs in different subsets of anchor UEs, wherein each subset of anchor UEs has fewer anchor UEs than the set of anchor UEs.

14. The UE of either of clauses 12 or 13, wherein the at least one processor is configured to determine the estimated positions for the UE and the accuracy levels associated with each estimated position based on the information received from different subsets of anchor UE by being configured to:

determine a range to each anchor UE; and determine the estimated position for the UE, for each subset of anchor UEs, based on the range to each anchor UE in a subset of anchor UEs and the known position of each anchor UE in the subset of anchor UEs.

15. The UE of any of clauses 12-14, wherein the accuracy levels associated with each estimated position comprise one or more of a confidence level or an estimation covariance.

16. The UE of any of clauses 12-15, wherein the at least one processor is configured to select at least one anchor UE to be excluded from the subsequent positioning session by being configured to:

generate comparisons of accuracy levels for the different subsets of anchor UEs by comparing an accuracy level determined based on information received from the set of anchor UEs to each accuracy level determined based on information received from anchor UEs in different subsets of anchor UEs; and determine a subset of anchor of UEs with an associated comparison of accuracy levels that is greater than a predetermined threshold; and select the at least one anchor UE based on the set of anchor UEs and the determined subset of anchor UEs.

17. The UE of any of clauses 12-16, wherein the at least one processor is configured to select at least one anchor UE to be excluded from the subsequent positioning session by being configured to:

compare an accuracy level determined based on information received from the set of anchor UEs to each accuracy level determined based on information received from anchor UEs in different subsets of anchor UEs;

determine a subset of anchor of UEs with an associated accuracy level that is closer to the accuracy level associated with the set of anchor UEs than any other subset of anchor UEs; and select the at least one anchor UE based on the set of anchor UEs and the determined subset of anchor UEs.

18. The UE of any of clauses 12-17, wherein the at least one processor is configured to initiate the first positioning session directly with the first plurality of responder UEs by being configured to:

broadcast a first initial pre-ranging message to initiate the first positioning session, the first initial pre-ranging message identifying each responder UE in the first plurality of responder UEs; and receive a first response pre-ranging message from each responder UE in the first plurality of responder UEs.

19. The UE of clause 18, wherein the at least one processor is configured to initiate the second positioning session directly with the second plurality of responder UEs by being configured to:

broadcast a second initial pre-ranging message to initiate the second positioning session, the second initial pre-ranging message identifying each responder UE in the second plurality of responder UEs, wherein the selected at least one anchor UE is not identified in the second initial pre-ranging message;

receive a second response pre-ranging message from each responder UE in the second plurality of responder UEs.

20. The UE of clause 18, wherein the at least one processor is configured to initiate the second positioning session directly with the second plurality of responder UEs by being configured to:

broadcast a second initial pre-ranging message to initiate the second positioning session, the second initial pre-ranging message identifying each responder UE in the second plurality of responder UEs, wherein the selected at least one anchor UE is identified in the second initial pre-ranging message; and provide an indication to the selected at least one anchor UE that the selected at least one anchor UE will not transmit the post-ranging message during the second positioning session.

21. The UE of clause 20, wherein the indication provided to the selected at least one anchor UE that the selected at least one anchor UE will not transmit the post-ranging message during the second positioning session is included in one of the second initial pre-ranging message or a separate message.

22. The UE of clause 20, wherein the selected at least one anchor UE does not participate in the second positioning session when a second UE that requires positioning provides a second indication to the selected at least one anchor UE that the selected at least one anchor UE will not transmit the post-ranging message during the second positioning session.

23. A user equipment (UE) configured for positioning based on ranging in a distributed system of UEs, the UE comprising:

means for initiating a first positioning session directly with a first plurality of responder UEs, wherein the first plurality of responder UEs comprises a set of anchor UEs;

means for receiving from each anchor UE in the first positioning session a post-ranging message comprising information including a known position of the respective anchor UE;

means for determining estimated positions for the UE and accuracy levels associated with each estimated position based on the information received from different subsets of anchor UEs;

means for selecting at least one anchor UE to be excluded from a subsequent positioning session based on the accuracy levels determined based on the information received from the different subsets of anchor UEs; and means for initiating a second positioning session directly with a second plurality of responder UEs, wherein the selected at least one anchor UE is excluded from the second positioning session.

24. The UE of clause 23, wherein the means for determining the estimated positions for the UE and the accuracy levels associated with each estimated position based on the information received from the different subsets of anchor comprises:

means for determining an estimated position for the UE and an accuracy level associated with the estimated position based on information received from each anchor UE in the set of anchor UEs; and means for determining a plurality of estimated positions for the UE and accuracy levels associated with the plurality of estimated positions based on information received from anchor UEs in different subsets of anchor UEs, wherein each subset of anchor UEs has fewer anchor UEs than the set of anchor UEs.

25. The UE of either of clauses 23 or 24, wherein the means for determining the estimated positions for the UE and the accuracy levels associated with each estimated position based on the information received from different subsets of anchor UE comprises:

means for determining a range to each anchor UE; and means for determining the estimated position for the UE, for each subset of anchor UEs, based on the range to each anchor UE in a subset of anchor UEs and the known position of each anchor UE in the subset of anchor UEs.

26. The UE of any of clauses 23-25, wherein the accuracy levels associated with each estimated position comprise one or more of a confidence level or an estimation covariance.

27. The UE of any of clauses 23-26, wherein the means for selecting at least one anchor UE to be excluded from the subsequent positioning session comprises:

means for generating comparisons of accuracy levels for the different subsets of anchor UEs by comparing an accuracy level determined based on information received from the set of anchor UEs to each accuracy level determined based on information received from anchor UEs in different subsets of anchor UEs; and means for determining a subset of anchor of UEs with an associated comparison of accuracy levels that is greater than a predetermined threshold; and means for selecting the at least one anchor UE based on the set of anchor UEs and the determined subset of anchor UEs.

28. The UE of any of clauses 23-27, wherein the means for selecting at least one anchor UE to be excluded from the subsequent positioning session comprises:

means for comparing an accuracy level determined based on information received from the set of anchor UEs to each accuracy level determined based on information received from anchor UEs in different subsets of anchor UEs;

means for determining a subset of anchor of UEs with an associated accuracy level that is closer to the accuracy level associated with the set of anchor UEs than any other subset of anchor UEs; and means for selecting the at least one anchor UE based on the set of anchor UEs and the determined subset of anchor UEs.

29. The UE of any of clauses 23-28, wherein the means for initiating the first positioning session directly with the first plurality of responder UEs comprises:

means for broadcasting a first initial pre-ranging message to initiate the first positioning session, the first initial pre-ranging message identifying each responder UE in the first plurality of responder UEs; and means for receiving a first response pre-ranging message from each responder UE in the first plurality of responder UEs.

30. The UE of clause 29, wherein the means for initiating the second positioning session directly with the second plurality of responder UEs comprises:

means for broadcasting a second initial pre-ranging message to initiate the second positioning session, the second initial pre-ranging message identifying each responder UE in the second plurality of responder UEs, wherein the selected at least one anchor UE is not identified in the second initial pre-ranging message;

means for receiving a second response pre-ranging message from each responder UE in the second plurality of responder UEs.

31. The UE of clause 29, wherein the means for initiating the second positioning session directly with the second plurality of responder UEs comprises:

means for broadcasting a second initial pre-ranging message to initiate the second positioning session, the second initial pre-ranging message identifying each responder UE in the second plurality of responder UEs, wherein the selected at least one anchor UE is identified in the second initial pre-ranging message; and means for providing an indication to the selected at least one anchor UE that the selected at least one anchor UE will not transmit the post-ranging message during the second positioning session.

32. The UE of clause 31, wherein the indication provided to the selected at least one anchor UE that the selected at least one anchor UE will not transmit the post-ranging message during the second positioning session is included in one of the second initial pre-ranging message or a separate message.

33. The UE of clause 31, wherein the selected at least one anchor UE does not participate in the second positioning session when a second UE that requires positioning provides a second indication to the selected at least one anchor UE that the selected at least one anchor UE will not transmit the post-ranging message during the second positioning session.

34. A non-transitory storage medium including program code stored thereon, the program code is operable to configure at least one processor in a user equipment (UE) to perform positioning based on ranging in a distributed system of UEs, the program code comprising instructions to:

initiate a first positioning session directly with a first plurality of responder UEs, wherein the first plurality of responder UEs comprises a set of anchor UEs;

receive from each anchor UE in the first positioning session a post-ranging message comprising information including a known position of the respective anchor UE;

determine estimated positions for the UE and accuracy levels associated with each estimated position based on the information received from different subsets of anchor UEs;

select at least one anchor UE to be excluded from a subsequent positioning session based on the accuracy levels determined based on the information received from the different subsets of anchor UEs; and initiate a second positioning session directly with a second plurality of responder UEs, wherein the selected at least one anchor UE is excluded from the second positioning session.

35. The non-transitory storage medium including program code of clause 34, wherein the program code comprising instructions to determine the estimated positions for the UE and the accuracy levels associated with each estimated position based on the information received from the different subsets of anchor comprises instructions to:

determine an estimated position for the UE and an accuracy level associated with the estimated position based on information received from each anchor UE in the set of anchor UEs; and determine a plurality of estimated positions for the UE and accuracy levels associated with the plurality of estimated positions based on information received from anchor UEs in different subsets of anchor UEs, wherein each subset of anchor UEs has fewer anchor UEs than the set of anchor UEs.

36. The non-transitory storage medium including program code of either of clauses 34 of 35, wherein the program code comprising instructions to determine the estimated positions for the UE and the accuracy levels associated with each estimated position based on the information received from different subsets of anchor UE comprises instructions to:

determine a range to each anchor UE; and determine the estimated position for the UE, for each subset of anchor UEs, based on the range to each anchor UE in a subset of anchor UEs and the known position of each anchor UE in the subset of anchor UEs.

37. The non-transitory storage medium including program code of any of clauses 34-36, wherein the accuracy levels associated with each estimated position comprise one or more of a confidence level or an estimation covariance.

38. The non-transitory storage medium including program code of any of clauses 34-37, wherein the program code comprising instructions to select at least one anchor UE to be excluded from the subsequent positioning session comprises instructions to:

generate comparisons of accuracy levels for the different subsets of anchor UEs by comparing an accuracy level determined based on information received from the set of anchor UEs to each accuracy level determined based on information received from anchor UEs in different subsets of anchor UEs; and determine a subset of anchor of UEs with an associated comparison of accuracy levels that is greater than a predetermined threshold; and select the at least one anchor UE based on the set of anchor UEs and the determined subset of anchor UEs.

39. The non-transitory storage medium including program code of any of clauses 34-38, wherein the program code comprising instructions to select at least one anchor UE to be excluded from the subsequent positioning session comprises instructions to:

compare an accuracy level determined based on information received from the set of anchor UEs to each accuracy level determined based on information received from anchor UEs in different subsets of anchor UEs;

determine a subset of anchor of UEs with an associated accuracy level that is closer to the accuracy level associated with the set of anchor UEs than any other subset of anchor UEs; and select the at least one anchor UE based on the set of anchor UEs and the determined subset of anchor UEs.

40. The non-transitory storage medium including program code of any of clauses 34-39, wherein the program code comprising instructions to initiating the first positioning session directly with the first plurality of responder UEs comprises instructions to:

broadcast a first initial pre-ranging message to initiate the first positioning session, the first initial pre-ranging message identifying each responder UE in the first plurality of responder UEs; and receive a first response pre-ranging message from each responder UE in the first plurality of responder UEs.

41. The non-transitory storage medium including program code of clause 40, wherein the program code comprising instructions to initiate the second positioning session directly with the second plurality of responder UEs comprises instructions to:

broadcast a second initial pre-ranging message to initiate the second positioning session, the second initial pre-ranging message identifying each responder UE in the second plurality of responder UEs, wherein the selected at least one anchor UE is not identified in the second initial pre-ranging message;

receive a second response pre-ranging message from each responder UE in the second plurality of responder UEs.

42. The non-transitory storage medium including program code of clause 40, wherein the program code comprising instructions to initiate the second positioning session directly with the second plurality of responder UEs comprises instructions to:

broadcast a second initial pre-ranging message to initiate the second positioning session, the second initial pre-ranging message identifying each responder UE in the second plurality of responder UEs, wherein the selected at least one anchor UE is identified in the second initial pre-ranging message; and provide an indication to the selected at least one anchor UE that the selected at least one anchor UE will not transmit the post-ranging message during the second positioning session.

43. The non-transitory storage medium including program code of clause 42, wherein the indication provided to the selected at least one anchor UE that the selected at least one anchor UE will not transmit the post-ranging message during the second positioning session is included in one of the second initial pre-ranging message or a separate message.

44. The non-transitory storage medium including program code of clause 42, wherein the selected at least one anchor UE does not participate in the second positioning session when a second UE that requires positioning provides a second indication to the selected at least one anchor UE that the selected at least one anchor UE will not transmit the post-ranging message during the second positioning session.

45. A method of positioning based on ranging in a distributed system of user equipment (UE) performed by a UE, the method comprising:

receiving a first initial pre-ranging message broadcast from a initiator UE to initiate a first positioning session, the first initial pre-ranging message identifying a set of responder UEs including the UE;

participating in the first positioning session with the initiator UE including sending a post-ranging message comprising information including a known position for the UE to the initiator UE;

receiving a second initial pre-ranging message broadcast from the initiator UE to initiate a second positioning session, the second initial pre-ranging message identifying the set of anchor UEs including the UE; and receiving from the initiator UE an indication that the UE will not transmit the post-ranging message in the second positioning session.

46. The method of clause 45, wherein the indication received from the initiator UE that UE will not transmit the post-ranging message in the second positioning session is included in one of the second initial pre-ranging message or a separate message.

47. The method of either of clauses 45 or 46, wherein participating in the first positioning session with the initiator UE comprises:

broadcasting a first response pre-ranging message to the initiator UE;

receiving a first ranging signal that is broadcast by the initiator UE;

broadcasting a second ranging signal that is received by the initiator UE;

receiving an initial post-ranging message broadcast by the initiator UE that comprises a first time of departure of the first ranging signal and a first time of arrival of the second ranging signal;

broadcasting the post-ranging message that is received by the initiator UE that comprises the information including a second time of arrival of the first ranging signal and a second time of departure arrival of the second ranging signal, and the known position of the UE.

48. The method of clause 47, further comprising:

broadcasting a second response pre-ranging message to the initiator UE in response to the second initial pre-ranging message broadcast from the initiator UE to initiate the second positioning session, wherein the UE does not broadcast a ranging signal in the second positioning session and does not broadcast the post-ranging message in the second positioning session.

49. The method of any of clauses 45-48, further comprising:

receiving from a second UE that requires positioning a second indication that the UE will not transmit the post-ranging message in the second positioning session wherein the UE does not transmit the post-ranging message in the second positioning session.

50. The method of any of clauses 45-49, further comprising:

receiving from a second UE that requires positioning an indication that the UE will transmit the post-ranging message in the second positioning session;

participating in the second positioning session including sending a second post-ranging message comprising information including the known position for the UE to the initiator UE and the second UE.

51. A user equipment (UE) configured for positioning based on ranging in a distributed system of UEs, the UE comprising:

a wireless transceiver configured to wirelessly communicate with entities in a wireless network;

at least one memory; and at least one processor coupled to the wireless transceiver and the at least one memory, wherein the at least one processor is configured to:

receive a first initial pre-ranging message broadcast from an initiator UE to initiate a first positioning session, the first initial pre-ranging message identifying a set of responder UEs including the UE;

participate in the first positioning session with the initiator UE including being configured to send a post-ranging message comprising information including a known position for the UE to the initiator UE;

receive a second initial pre-ranging message broadcast from the initiator UE to initiate a second positioning session, the second initial pre-ranging message identifying the set of anchor UEs including the UE; and receive from the initiator UE an indication that the UE will not transmit the post-ranging message in the second positioning session.

52. The UE of clause 51, wherein the indication received from the initiator UE that UE will not transmit the post-ranging message in the second positioning session is included in one of the second initial pre-ranging message or a separate message.

53. The UE of either of clauses 51 or 52, wherein the at least one processor is configured to participate in the first positioning session with the initiator UE by being configured to:

broadcast a first response pre-ranging message to the initiator UE;

receive a first ranging signal that is broadcast by the initiator UE;

broadcast a second ranging signal that is received by the initiator UE;

receive an initial post-ranging message broadcast by the initiator UE that comprises a first time of departure of the first ranging signal and a first time of arrival of the second ranging signal;

broadcast the post-ranging message that is received by the initiator UE that comprises the information including a second time of arrival of the first ranging signal and a second time of departure arrival of the second ranging signal, and the known position of the UE.

54. The UE of clause 53, wherein the at least one processor is further configured to:

broadcast a second response pre-ranging message to the initiator UE in response to the second initial pre-ranging message broadcast from the initiator UE to initiate the second positioning session, wherein the UE does not broadcast a ranging signal in the second positioning session and does not broadcast the post-ranging message in the second positioning session.

55. The UE of any of clauses 51-54, wherein the at least one processor is further configured to:

receive from a second UE that requires positioning a second indication that the UE will not transmit the post-ranging message in the second positioning session wherein the UE does not transmit the post-ranging message in the second positioning session.

56. The UE of any of clauses 51-55, wherein the at least one processor is further configured to:

receive from a second UE that requires positioning an indication that the UE will transmit the post-ranging message in the second positioning session;

participate in the second positioning session including being configured to send a second post-ranging message comprising information including the known position for the UE to the initiator UE and the second UE.

57. A user equipment (UE) configured for positioning based on ranging in a distributed system of UEs, the UE comprising:

means for receiving a first initial pre-ranging message broadcast from a initiator UE to initiate a first positioning session, the first initial pre-ranging message identifying a set of responder UEs including the UE;

means for participating in the first positioning session with the initiator UE including sending a post-ranging message comprising information including a known position for the UE to the initiator UE;

means for receiving a second initial pre-ranging message broadcast from the initiator UE to initiate a second positioning session, the second initial pre-ranging message identifying the set of anchor UEs including the UE; and means for receiving from the initiator UE an indication that the UE will not transmit the post-ranging message in the second positioning session.

58. The UE of clause 57, wherein the indication received from the initiator UE that UE will not transmit the post-ranging message in the second positioning session is included in one of the second initial pre-ranging message or a separate message.

59. The UE of either of clauses 57 or 58, wherein the means for participating in the first positioning session with the initiator UE comprises:

means for broadcasting a first response pre-ranging message to the initiator UE;

means for receiving a first ranging signal that is broadcast by the initiator UE;

means for broadcasting a second ranging signal that is received by the initiator UE;

means for receiving an initial post-ranging message broadcast by the initiator UE that comprises a first time of departure of the first ranging signal and a first time of arrival of the second ranging signal;

means for broadcasting the post-ranging message that is received by the initiator UE that comprises the information including a second time of arrival of the first ranging signal and a second time of departure arrival of the second ranging signal, and the known position of the UE.

60. The UE of clause 59, further comprising:

means for broadcasting a second response pre-ranging message to the initiator UE in response to the second initial pre-ranging message broadcast from the initiator UE to initiate the second positioning session, wherein the UE does not broadcast a ranging signal in the second positioning session and does not broadcast the post-ranging message in the second positioning session.

61. The UE of any of clauses 57-60, further comprising:

means for receiving from a second UE that requires positioning a second indication that the UE will not transmit the post-ranging message in the second positioning session wherein the UE does not transmit the post-ranging message in the second positioning session.

62. The UE of any of clauses 57-61, further comprising:

means for receiving from a second UE that requires positioning an indication that the UE will transmit the post-ranging message in the second positioning session;

means for participating in the second positioning session including sending a second post-ranging message comprising information including the known position for the UE to the initiator UE and the second UE.

63. A non-transitory storage medium including program code stored thereon, the program code is operable to configure at least one processor in a user equipment (UE) to perform positioning based on ranging in a distributed system of UEs, the program code comprising instructions to:

receive a first initial pre-ranging message broadcast from an initiator UE to initiate a first positioning session, the first initial pre-ranging message identifying a set of responder UEs including the UE;

participate in the first positioning session with the initiator UE including comprising instructions to send a post-ranging message comprising information including a known position for the UE to the initiator UE;

receive a second initial pre-ranging message broadcast from the initiator UE to initiate a second positioning session, the second initial pre-ranging message identifying the set of anchor UEs including the UE; and receive from the initiator UE an indication that the UE will not transmit the post-ranging message in the second positioning session.

64. The non-transitory storage medium including program code of clause 63, wherein the indication received from the initiator UE that UE will not transmit the post-ranging message in the second positioning session is included in one of the second initial pre-ranging message or a separate message.

65. The non-transitory storage medium including program code of either of clauses 63 or 64, wherein the program code comprising instructions to participate in the first positioning session with the initiator UE comprises instructions to:

broadcast a first response pre-ranging message to the initiator UE;

receive a first ranging signal that is broadcast by the initiator UE;

broadcast a second ranging signal that is received by the initiator UE;

receive an initial post-ranging message broadcast by the initiator UE that comprises a first time of departure of the first ranging signal and a first time of arrival of the second ranging signal;

broadcast the post-ranging message that is received by the initiator UE that comprises the information including a second time of arrival of the first ranging signal and a second time of departure arrival of the second ranging signal, and the known position of the UE.

66. The non-transitory storage medium including program code of clause 66, wherein the program code further comprises instructions to:

broadcast a second response pre-ranging message to the initiator UE in response to the second initial pre-ranging message broadcast from the initiator UE to initiate the second positioning session, wherein the UE does not broadcast a ranging signal in the second positioning session and does not broadcast the post-ranging message in the second positioning session.

67. The non-transitory storage medium including program code of any of clauses 63-66, wherein the program code further comprises instructions to:

receive from a second UE that requires positioning a second indication that the UE will not transmit the post-ranging message in the second positioning session wherein the UE does not transmit the post-ranging message in the second positioning session.

68. The non-transitory storage medium including program code of any of clauses 63-67, wherein the program code further comprises instructions to:

receive from a second UE that requires positioning an indication that the UE will transmit the post-ranging message in the second positioning session; and participate in the second positioning session including instructures to send a second post-ranging message comprising information including the known position for the UE to the initiator UE and the second UE.

Therefore, it is intended that claimed subject matter not be limited to the particular examples disclosed, but that such claimed subject matter may also include all aspects falling within the scope of appended claims, and equivalents thereof.

What is claimed is:

1. A method of positioning based on ranging performed by a UE in a distributed system of user equipments (UEs), the method comprising:
   initiating a first positioning session directly with a first plurality of responder UEs, wherein the first plurality of responder UEs comprises a set of anchor UEs;
   receiving from each anchor UE in the first positioning session a post-ranging message comprising information including a known position of the respective anchor UE;
   determining estimated positions for the UE and accuracy levels associated with each estimated position based on the information received from different subsets of anchor UEs, wherein determining the estimated positions for the UE and the accuracy levels associated with each estimated position based on the information received from different subsets of anchor UEs comprises:
      determining an estimated position for the UE and an accuracy level associated with the estimated position based on information received from each anchor UE in the set of anchor UEs; and
      determining a plurality of estimated positions for the UE and accuracy levels associated with the plurality of estimated positions based on information received from anchor UEs in different subsets of anchor UEs, wherein each subset of anchor UEs has fewer anchor UEs than the set of anchor UEs;
   selecting at least one anchor UE to be excluded from a subsequent positioning session based on the accuracy levels determined based on the information received from the different subsets of anchor UEs; and
   initiating a second positioning session directly with a second plurality of responder UEs, wherein the selected at least one anchor UE is excluded from the second positioning session.

2. The method of claim 1, wherein determining the estimated positions for the UE and the accuracy levels associated with each estimated position based on the information received from different subsets of anchor UE also comprises:
   determining a range to each anchor UE; and
   determining the estimated position for the UE, for each subset of anchor UEs, based on the range to each anchor UE in a subset of anchor UEs and the known position of each anchor UE in the subset of anchor UEs.

3. The method of claim 1, wherein the accuracy levels associated with each estimated position comprise one or more of a confidence level or an estimation covariance.

4. The method of claim 1, wherein selecting at least one anchor UE to be excluded from the subsequent positioning session comprises:
   generating comparisons of accuracy levels for the different subsets of anchor UEs by comparing an accuracy level determined based on information received from the set of anchor UEs to each accuracy level determined based on information received from anchor UEs in different subsets of anchor UEs;
   determining a subset of anchor of UEs with an associated comparison of accuracy levels that is greater than a predetermined threshold; and
   selecting the at least one anchor UE based on the set of anchor UEs and the determined subset of anchor UEs.

5. The method of claim 1, wherein selecting at least one anchor UE to be excluded from the subsequent positioning session comprises:
   comparing an accuracy level determined based on information received from the set of anchor UEs to each accuracy level determined based on information received from anchor UEs in different subsets of anchor UEs;
   determining a subset of anchor of UEs with an associated accuracy level that is closer to the accuracy level associated with the set of anchor UEs than any other subset of anchor UEs; and
   selecting the at least one anchor UE based on the set of anchor UEs and the determined subset of anchor UEs.

6. The method of claim 1, wherein initiating the first positioning session directly with the first plurality of responder UEs comprises:
   broadcasting a first initial pre-ranging message to initiate the first positioning session, the first initial pre-ranging message identifying each responder UE in the first plurality of responder UEs; and
   receiving a first response pre-ranging message from each responder UE in the first plurality of responder UEs.

7. The method of claim 6, wherein initiating the second positioning session directly with the second plurality of responder UEs comprises:
   broadcasting a second initial pre-ranging message to initiate the second positioning session, the second initial pre-ranging message identifying each responder UE in the second plurality of responder UEs, wherein the selected at least one anchor UE is not identified in the second initial pre-ranging message; and
   receiving a second response pre-ranging message from each responder UE in the second plurality of responder UEs.

8. The method of claim 6, wherein initiating the second positioning session directly with the second plurality of responder UEs comprises:
   broadcasting a second initial pre-ranging message to initiate the second positioning session, the second initial pre-ranging message identifying each responder UE in the second plurality of responder UEs, wherein the selected at least one anchor UE is identified in the second initial pre-ranging message; and
   providing an indication to the selected at least one anchor UE that the selected at least one anchor UE will not transmit the post-ranging message during the second positioning session.

9. The method of claim 8, wherein the indication provided to the selected at least one anchor UE that the selected at least one anchor UE will not transmit the post-ranging message during the second positioning session is included in one of the second initial pre-ranging message or a separate message.

10. The method of claim 8, wherein the selected at least one anchor UE does not participate in the second positioning session when a second UE that requires positioning provides a second indication to the selected at least one anchor UE that the selected at least one anchor UE will not transmit the post-ranging message during the second positioning session.

11. A user equipment (UE) configured for positioning based on ranging in a distributed system of UEs, the UE comprising:
- a wireless transceiver configured to wirelessly communicate with entities in a wireless network;
- at least one memory; and
- at least one processor coupled to the wireless transceiver and the at least one memory, wherein the at least one processor is configured to:
  - initiate a first positioning session directly with a first plurality of responder UEs, wherein the first plurality of responder UEs comprises a set of anchor UEs;
  - receive from each anchor UE in the first positioning session a post-ranging message comprising information including a known position of the respective anchor UE;
  - determine estimated positions for the UE and accuracy levels associated with each estimated position based on the information received from different subsets of anchor UEs, wherein the at least one processor is configured to determine the estimated positions for the UE and the accuracy levels associated with each estimated position based on the information received from the different subsets of anchor by being configured to:
    - determine an estimated position for the UE and an accuracy level associated with the estimated position based on information received from each anchor UE in the set of anchor UEs; and
    - determine a plurality of estimated positions for the UE and accuracy levels associated with the plurality of estimated positions based on information received from anchor UEs in different subsets of anchor UEs, wherein each subset of anchor UEs has fewer anchor UEs than the set of anchor UEs;
  - select at least one anchor UE to be excluded from a subsequent positioning session based on the accuracy levels determined based on the information received from the different subsets of anchor UEs; and
  - initiate a second positioning session directly with a second plurality of responder UEs, wherein the selected at least one anchor UE is excluded from the second positioning session.

12. The UE of claim 11, wherein the at least one processor is configured to determine the estimated positions for the UE and the accuracy levels associated with each estimated position based on the information received from different subsets of anchor UE by being also configured to:
- determine a range to each anchor UE; and
- determine the estimated position for the UE, for each subset of anchor UEs, based on the range to each anchor UE in a subset of anchor UEs and the known position of each anchor UE in the subset of anchor UEs.

13. The UE of claim 11, wherein the accuracy levels associated with each estimated position comprise one or more of a confidence level or an estimation covariance.

14. The UE of claim 11, wherein the at least one processor is configured to select at least one anchor UE to be excluded from the subsequent positioning session by being configured to:
- generate comparisons of accuracy levels for the different subsets of anchor UEs by comparing an accuracy level determined based on information received from the set of anchor UEs to each accuracy level determined based on information received from anchor UEs in different subsets of anchor UEs;
- determine a subset of anchor of UEs with an associated comparison of accuracy levels that is greater than a predetermined threshold; and
- select the at least one anchor UE based on the set of anchor UEs and the determined subset of anchor UEs.

15. The UE of claim 11, wherein the at least one processor is configured to select at least one anchor UE to be excluded from the subsequent positioning session by being configured to:
- compare an accuracy level determined based on information received from the set of anchor UEs to each accuracy level determined based on information received from anchor UEs in different subsets of anchor UEs;
- determine a subset of anchor of UEs with an associated accuracy level that is closer to the accuracy level associated with the set of anchor UEs than any other subset of anchor UEs; and
- select the at least one anchor UE based on the set of anchor UEs and the determined subset of anchor UEs.

16. The UE of claim 11, wherein the at least one processor is configured to initiate the first positioning session directly with the first plurality of responder UEs by being configured to:
- broadcast a first initial pre-ranging message to initiate the first positioning session, the first initial pre-ranging message identifying each responder UE in the first plurality of responder UEs; and
- receive a first response pre-ranging message from each responder UE in the first plurality of responder UEs.

17. The UE of claim 16, wherein the at least one processor is configured to initiate the second positioning session directly with the second plurality of responder UEs by being configured to:
- broadcast a second initial pre-ranging message to initiate the second positioning session, the second initial pre-ranging message identifying each responder UE in the second plurality of responder UEs, wherein the selected at least one anchor UE is not identified in the second initial pre-ranging message; and
- receive a second response pre-ranging message from each responder UE in the second plurality of responder UEs.

18. The UE of claim 16, wherein the at least one processor is configured to initiate the second positioning session directly with the second plurality of responder UEs by being configured to:
- broadcast a second initial pre-ranging message to initiate the second positioning session, the second initial pre-ranging message identifying each responder UE in the second plurality of responder UEs, wherein the selected at least one anchor UE is identified in the second initial pre-ranging message; and
- provide an indication to the selected at least one anchor UE that the selected at least one anchor UE will not transmit the post-ranging message during the second positioning session.

19. The UE of claim 18, wherein the indication provided to the selected at least one anchor UE that the selected at least one anchor UE will not transmit the post-ranging message during the second positioning session is included in one of the second initial pre-ranging message or a separate message.

20. The UE of claim 18, wherein the selected at least one anchor UE does not participate in the second positioning session when a second UE that requires positioning provides a second indication to the selected at least one anchor UE that the selected at least one anchor UE will not transmit the post-ranging message during the second positioning session.

21. A user equipment (UE) configured for positioning based on ranging in a distributed system of UEs, the UE comprising:
   means for initiating a first positioning session directly with a first plurality of responder UEs, wherein the first plurality of responder UEs comprises a set of anchor UEs;
   means for receiving from each anchor UE in the first positioning session a post-ranging message comprising information including a known position of the respective anchor UE;
   means for determining estimated positions for the UE and accuracy levels associated with each estimated position based on the information received from different subsets of anchor UEs, wherein the means for determining the estimated positions for the UE and the accuracy levels associated with each estimated position based on the information received from the different subsets of anchor comprises:
      means for determining an estimated position for the UE and an accuracy level associated with the estimated position based on information received from each anchor UE in the set of anchor UEs; and
      means for determining a plurality of estimated positions for the UE and accuracy levels associated with the plurality of estimated positions based on information received from anchor UEs in different subsets of anchor UEs, wherein each subset of anchor UEs has fewer anchor UEs than the set of anchor UEs;
   means for selecting at least one anchor UE to be excluded from a subsequent positioning session based on the accuracy levels determined based on the information received from the different subsets of anchor UEs; and
   means for initiating a second positioning session directly with a second plurality of responder UEs, wherein the selected at least one anchor UE is excluded from the second positioning session.

22. The UE of claim 21, wherein the means for determining the estimated positions for the UE and the accuracy levels associated with each estimated position based on the information received from different subsets of anchor UE also comprises:
   means for determining a range to each anchor UE; and
   means for determining the estimated position for the UE, for each subset of anchor UEs, based on the range to each anchor UE in a subset of anchor UEs and the known position of each anchor UE in the subset of anchor UEs.

23. The UE of claim 21, wherein the means for selecting at least one anchor UE to be excluded from the subsequent positioning session comprises:
   means for generating comparisons of accuracy levels for the different subsets of anchor UEs by comparing an accuracy level determined based on information received from the set of anchor UEs to each accuracy level determined based on information received from anchor UEs in different subsets of anchor UEs;
   means for determining a subset of anchor of UEs with an associated comparison of accuracy levels that is greater than a predetermined threshold; and
   means for selecting the at least one anchor UE based on the set of anchor UEs and the determined subset of anchor UEs.

24. The UE of claim 21, wherein the means for selecting at least one anchor UE to be excluded from the subsequent positioning session comprises:
   means for comparing an accuracy level determined based on information received from the set of anchor UEs to each accuracy level determined based on information received from anchor UEs in different subsets of anchor UEs;
   means for determining a subset of anchor of UEs with an associated accuracy level that is closer to the accuracy level associated with the set of anchor UEs than any other subset of anchor UEs; and
   means for selecting the at least one anchor UE based on the set of anchor UEs and the determined subset of anchor UEs.

25. The UE of claim 21, wherein the means for initiating the first positioning session directly with the first plurality of responder UEs comprises:
   means for broadcasting a first initial pre-ranging message to initiate the first positioning session, the first initial pre-ranging message identifying each responder UE in the first plurality of responder UEs; and
   means for receiving a first response pre-ranging message from each responder UE in the first plurality of responder UEs.

26. The UE of claim 25, wherein the selected at least one anchor UE does not participate in the second positioning session when a second UE that requires positioning provides a second indication to the selected at least one anchor UE that the selected at least one anchor UE will not transmit the post-ranging message during the second positioning session.

27. A method of positioning based on ranging in a distributed system of user equipment (UE) performed by a UE, the method comprising:
   receiving a first initial pre-ranging message broadcast from an initiator UE to initiate a first positioning session, the first initial pre-ranging message identifying a set of responder UEs including the UE;
   participating in the first positioning session with the initiator UE including sending a post-ranging message comprising information including a known position for the UE to the initiator UE;
   receiving a second initial pre-ranging message broadcast from the initiator UE to initiate a second positioning session, the second initial pre-ranging message identifying the set of anchor UEs including the UE; and
   receiving from the initiator UE an indication that the UE will not transmit the post-ranging message in the second positioning session, wherein the indication is included in one of the second initial pre-ranging message or a separate message.

28. The method of claim 27, wherein participating in the first positioning session with the initiator UE comprises:
   broadcasting a first response pre-ranging message to the initiator UE;
   receiving a first ranging signal that is broadcast by the initiator UE;
   broadcasting a second ranging signal that is received by the initiator UE;
   receiving an initial post-ranging message broadcast by the initiator UE that comprises a first time of departure of the first ranging signal and a first time of arrival of the second ranging signal; and
   broadcasting the post-ranging message that is received by the initiator UE that comprises the information including a second time of arrival of the first ranging signal and a second time of departure arrival of the second ranging signal, and the known position of the UE.

29. The method of claim 28, further comprising:
broadcasting a second response pre-ranging message to the initiator UE in response to the second initial pre-ranging message broadcast from the initiator UE to initiate the second positioning session, wherein the UE does not broadcast a ranging signal in the second positioning session and does not broadcast the post-ranging message in the second positioning session.

30. The method of claim 27, further comprising:
receiving from a second UE that requires positioning a second indication that the UE will not transmit the post-ranging message in the second positioning session wherein the UE does not transmit the post-ranging message in the second positioning session.

31. The method of claim 27, further comprising:
receiving from a second UE that requires positioning an indication that the UE will transmit the post-ranging message in the second positioning session; and
participating in the second positioning session including sending a second post-ranging message comprising information including the known position for the UE to the initiator UE and the second UE.

32. A user equipment (UE) configured for positioning based on ranging in a distributed system of UEs, the UE comprising:
a wireless transceiver configured to wirelessly communicate with entities in a wireless network;
at least one memory; and
at least one processor coupled to the wireless transceiver and the at least one memory, wherein the at least one processor is configured to:
receive a first initial pre-ranging message broadcast from an initiator UE to initiate a first positioning session, the first initial pre-ranging message identifying a set of responder UEs including the UE;
participate in the first positioning session with the initiator UE including being configured to send a post-ranging message comprising information including a known position for the UE to the initiator UE;
receive a second initial pre-ranging message broadcast from the initiator UE to initiate a second positioning session, the second initial pre-ranging message identifying the set of anchor UEs including the UE; and
receive from the initiator UE an indication that the UE will not transmit the post-ranging message in the second positioning session, wherein the indication is included in one of the second initial pre-ranging message or a separate message.

33. The UE of claim 32, wherein the at least one processor is configured to participate in the first positioning session with the initiator UE by being configured to:
broadcast a first response pre-ranging message to the initiator UE;
receive a first ranging signal that is broadcast by the initiator UE;
broadcast a second ranging signal that is received by the initiator UE;
receive an initial post-ranging message broadcast by the initiator UE that comprises a first time of departure of the first ranging signal and a first time of arrival of the second ranging signal; and
broadcast the post-ranging message that is received by the initiator UE that comprises the information including a second time of arrival of the first ranging signal and a second time of departure arrival of the second ranging signal, and the known position of the UE.

34. The UE of claim 33, wherein the at least one processor is further configured to:
broadcast a second response pre-ranging message to the initiator UE in response to the second initial pre-ranging message broadcast from the initiator UE to initiate the second positioning session, wherein the UE does not broadcast a ranging signal in the second positioning session and does not broadcast the post-ranging message in the second positioning session.

35. The UE of claim 32, wherein the at least one processor is further configured to:
receive from a second UE that requires positioning a second indication that the UE will not transmit the post-ranging message in the second positioning session wherein the UE does not transmit the post-ranging message in the second positioning session.

36. The UE of claim 32, wherein the at least one processor is further configured to:
receive from a second UE that requires positioning an indication that the UE will transmit the post-ranging message in the second positioning session; and
participate in the second positioning session including being configured to send a second post-ranging message comprising information including the known position for the UE to the initiator UE and the second UE.

37. A user equipment (UE) configured for positioning based on ranging in a distributed system of UEs, the UE comprising:
means for receiving a first initial pre-ranging message broadcast from an initiator UE to initiate a first positioning session, the first initial pre-ranging message identifying a set of responder UEs including the UE;
means for participating in the first positioning session with the initiator UE including sending a post-ranging message comprising information including a known position for the UE to the initiator UE;
means for receiving a second initial pre-ranging message broadcast from the initiator UE to initiate a second positioning session, the second initial pre-ranging message identifying the set of anchor UEs including the UE; and
means for receiving from the initiator UE an indication that the UE will not transmit the post-ranging message in the second positioning session, wherein the indication is included in one of the second initial pre-ranging message or a separate message.

38. The UE of claim 37, wherein the means for participating in the first positioning session with the initiator UE comprises:
means for broadcasting a first response pre-ranging message to the initiator UE;
means for receiving a first ranging signal that is broadcast by the initiator UE;
means for broadcasting a second ranging signal that is received by the initiator UE;
means for receiving an initial post-ranging message broadcast by the initiator UE that comprises a first time of departure of the first ranging signal and a first time of arrival of the second ranging signal;
means for broadcasting the post-ranging message that is received by the initiator UE that comprises the information including a second time of arrival of the first ranging signal and a second time of departure arrival of the second ranging signal, and the known position of the UE; and means for broadcasting a second response pre-ranging message to the initiator UE in response to the second initial pre-ranging message broadcast from the initiator UE to initiate the second positioning session, wherein the UE does not broadcast a ranging signal in the second positioning session and does not broadcast the post-ranging message in the second positioning session.

39. The UE of claim 37, further comprising:

means for receiving from a second UE that requires positioning an indication that the UE will transmit the post-ranging message in the second positioning session; and means for participating in the second positioning session including sending a second post-ranging message comprising information including the known position for the UE to the initiator UE and the second UE.

\* \* \* \* \*